(12) United States Patent
Choi et al.

(10) Patent No.: US 7,218,532 B2
(45) Date of Patent: May 15, 2007

(54) SWITCHING MODE POWER SUPPLY

(75) Inventors: Jin-Ho Choi, Plano, TX (US);
Young-Chul Ryu, Gyeonggi-do (KR);
Dong-Young Huh, Gyeonggi-do (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 100 days.

(21) Appl. No.: 11/153,819

(22) Filed: Jun. 15, 2005

(65) Prior Publication Data
US 2005/0281062 A1 Dec. 22, 2005

(30) Foreign Application Priority Data
Jun. 16, 2004 (KR) .................. 10-2004-0044481

(51) Int. Cl.
*H02M 3/335* (2006.01)
(52) U.S. Cl. .................. 363/21.01; 363/21.08; 363/21.16; 363/97
(58) Field of Classification Search .............. 363/16, 363/21.01, 21.07, 21.08, 21.09, 21.15, 21.16, 363/21.17, 95, 97
See application file for complete search history.

(56) References Cited

U.S. PATENT DOCUMENTS 6,252,783 B1    6/2001  Huh et al.
6,549,429 B2 *  4/2003  Konno ................... 363/21.09
6,646,894 B2 * 11/2003  Hong et al. ............. 363/21.01

* cited by examiner

*Primary Examiner*—Jessica Han
(74) *Attorney, Agent, or Firm*—Sidley Austin LLP

(57) ABSTRACT

In one embodiment, a switching mode power supply (SMPS) include: a power supply for supplying power to a secondary coil of a transformer according to an operation of a main switch, the main switch being coupled to a primary coil of the transformer; a feedback circuit for generating a feedback voltage corresponding to an output voltage; a control module for stopping the main switch when the feedback voltage is lower than a reference voltage in a standby operation mode; an integrated circuit (IC) power unit for generating a constant voltage, the IC power supply being coupled to the secondary coil of the transformer; and a current generator for using the constant voltage to generate a plurality of constant currents for operating a plurality of ICs, and generating a constant current from among the constant currents when the main switch performs no switching on/off operation.

11 Claims, 13 Drawing Sheets

SWITCHING MODE POWER SUPPLY

CROSS REFERENCE TO RELATED APPLICATION

This application claims priority to and the benefit of Korea Patent Application No. 10-2004-44481 filed on Jun. 16, 2004 in the Korean Intellectual Property Office, the entire content of which is incorporated herein by reference.

BACKGROUND OF THE INVENTION (a) Field of the Invention

The present invention relates to a switching mode power supply (SMPS). More specifically, the present invention relates to a switching mode power supply for reducing power consumption in the standby operation mode.

(b) Description of the Related Art

In general, a switching mode power supply (SMPS) converts a direct current (DC) supply voltage into one or more DC output voltages that have a greater or lesser magnitude than the DC supply voltage. SMPSs are widely used in power electronic devices, particularly battery-powered devices such as portable cellular phones and laptop computers. Typically, SMPSs have a normal operation mode and a standby operation mode. Power electronic devices consume a large amount of power in the normal operation mode, as compared to the standby operation mode. Power electronic devices may automatically enter the standby operation mode when a user does not use the device for a predetermined time frame, and may automatically enter the normal operation mode when the user resumes the use of the device.

In most electronic devices, power consumption in the standby operation mode is much less than power consumption in the normal operation mode. To reduce power consumption in the standby operation mode, input power to the electronic device is limited. Conventionally, to meet such control requirements, an output voltage of the SMPS is reduced, or an additional power source is used to reduce power consumption in the standby operation mode. However, such approaches for entering the standby operation mode are not desirable because they require additional components, thereby resulting in higher production costs. Moreover, the extent to which power consumption of the electronic device can be decreased is limited because it is likely that an output voltage below a predetermined level for operating the electronic devices may occur.

When using a conventional SMPS in the standby operation mode, a substantial switching loss occurs in the SMPS despite the reduction in power consumption due to a reduced output voltage. In addition, the conventional SMPS changes a duty cycle of a power switch in order to compensate for changes in power requirements at its output end, and operate at a predetermined frequency regardless of the amount of supplied power. As a result, the power switch within the conventional SMPS operating in the standby operation mode performs switch-on/off operations at the same rate as when the SMPS is operating in the normal operation mode. In the standby operation mode, such switching operations consume a considerable amount of power, which prevents greater decreases in power consumption in the standby operation mode.

In an attempt to solve such problems, a SMPS has been proposed which uses active circuitry to provide the normal operation mode, and a low power burst mode that enables a standby operation of an electronic device. U.S. Pat. No. 6,252,783 discloses the operation and configuration of such an SMPS. In the normal operation mode, the active circuitry couples an output voltage of the SMPS to a conventional switch driver circuit (or a control module circuit). This switch driver circuit changes a duty cycle of an output having a fixed frequency of a switch driver in order to regulate the output voltage of the SMPS to a desired level.

When the electronic device is operating in the low power burst mode, the active circuitry separates the output voltage of the SMPS from the switch driver circuit and applies a periodic signal to the switch driver. This periodic signal causes the switch driver to provide an output signal having a fixed frequency for predetermined time intervals. These time intervals are interleaved with time intervals during which the output of the switch driver is inactive, i.e., the switch driver turns the switch off. In addition, when the electronic device is operating in the low power burst mode, the active circuitry applies an input signal to the switch driver. This signal causes the switch driver to repeatedly turn the switch on and off at a fixed frequency, i.e., at a minimum duty cycle. The low power burst mode during which the switch driver provides the output having the fixed frequency is appropriately controlled so that a supply voltage to the switch driver may be varied between two reference voltages.

The above described SMPS having the low power burst mode reduces the switching loss by performing and stopping switch-on/off operations for a predetermined amount of time in the standby operation mode. This reduces power consumption. In addition, the SMPS can maintain a lower output voltage in the standby operation mode than in the normal operation mode, and can control the switch-on/off operations of the switch in the standby operation mode by using the low power burst mode at a predetermined time interval irrespective of the output voltage of the SMPS.

However, the SMPS having the low power burst mode may have audible noise as the maximum amplitude of current increases. As the maximum amplitude of current increases, so does the importance of the switching loss. In addition to the switching loss, the SMPS may also incur conduction loss and core loss. When a light load is used by the entire system, the switching loss increases relatively, and thus, frequent audible noise is caused and more power is consumed with the increase in the maximum amplitude of current.

SUMMARY OF THE INVENTION

According to one aspect of the present invention, a switching mode power supply (SMPS) may comprise: a power supply for supplying power to a secondary coil of a transformer according to an operation of a main switch, the main switch being coupled to a primary coil of the transformer; a feedback circuit for generating a feedback voltage corresponding to an output voltage; a control module for stopping the main switch when the feedback voltage is lower than a reference voltage in a standby operation mode; an integrated circuit (IC) power unit for generating a constant voltage, the IC power supply being coupled to the secondary coil of the transformer; and a current generator for using the constant voltage to generate a plurality of constant currents for operating a plurality of ICs, and generating a constant current from among the constant currents when the main switch performs no switching on/off operation.

In one embodiment, a single constant current from a plurality of constant currents may be used to operate an IC which controls the main switch to stop the switching on/off operation. The control module may comprise: a first constant current source for generating the first reference voltage; a second constant current source for generating the second reference voltage; and a current controller for reducing the current of the first constant current source when the main switch performs no switching on/off operation.

According to another aspect of the present invention, a switching mode power supply may comprise: a power supply for supplying power to a secondary coil of a transformer according to an operation of a main switch, the main switch being coupled to a primary coil of the transformer; a feedback circuit for generating a feedback voltage corresponding to an output voltage; an integrated circuit (IC) power unit for generating a constant voltage, the IC power supply being coupled to the secondary coil of the transformer; a control module for generating a first reference voltage and a second reference voltage lower than the first reference voltage, and controlling the main switch to stop the switching on/off operation when the feedback voltage is lower than the second reference voltage in a standby operation mode; and a current controller for using the constant voltage to generate a first constant current source for generating the first reference voltage and a second constant current source for generating the second reference voltage, and reducing the current of the first constant current source when the main switch performs no switching on/off operation.

In one embodiment, the control module may further comprise a comparator for comparing the second reference voltage with the feedback voltage, and a sensor for sensing when the feedback voltage is lower than the second reference voltage according to an output signal of the comparator. The current controller reduces the current of the first constant current source according to an output signal of the sensor.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The embodiments of the present invention and their advantages are best understood by referring to FIGS. 1 through 13 of the drawings. Like numerals are used for like and corresponding parts of the various drawings.

An advantage of an embodiment of the present invention is to provide a switching mode power supply for maintaining the maximum amplitude of current below a predetermined value irrespective of variations in the output voltage of the SMPS. Other advantages of this embodiment of the present invention may include the ease of conversion from a burst operation mode to a normal operation mode, and the prevention of erroneous operations.

Another advantage of an embodiment of the present invention is to provide a switching mode power supply for reducing power consumption in the standby operation mode.

Figure 1:
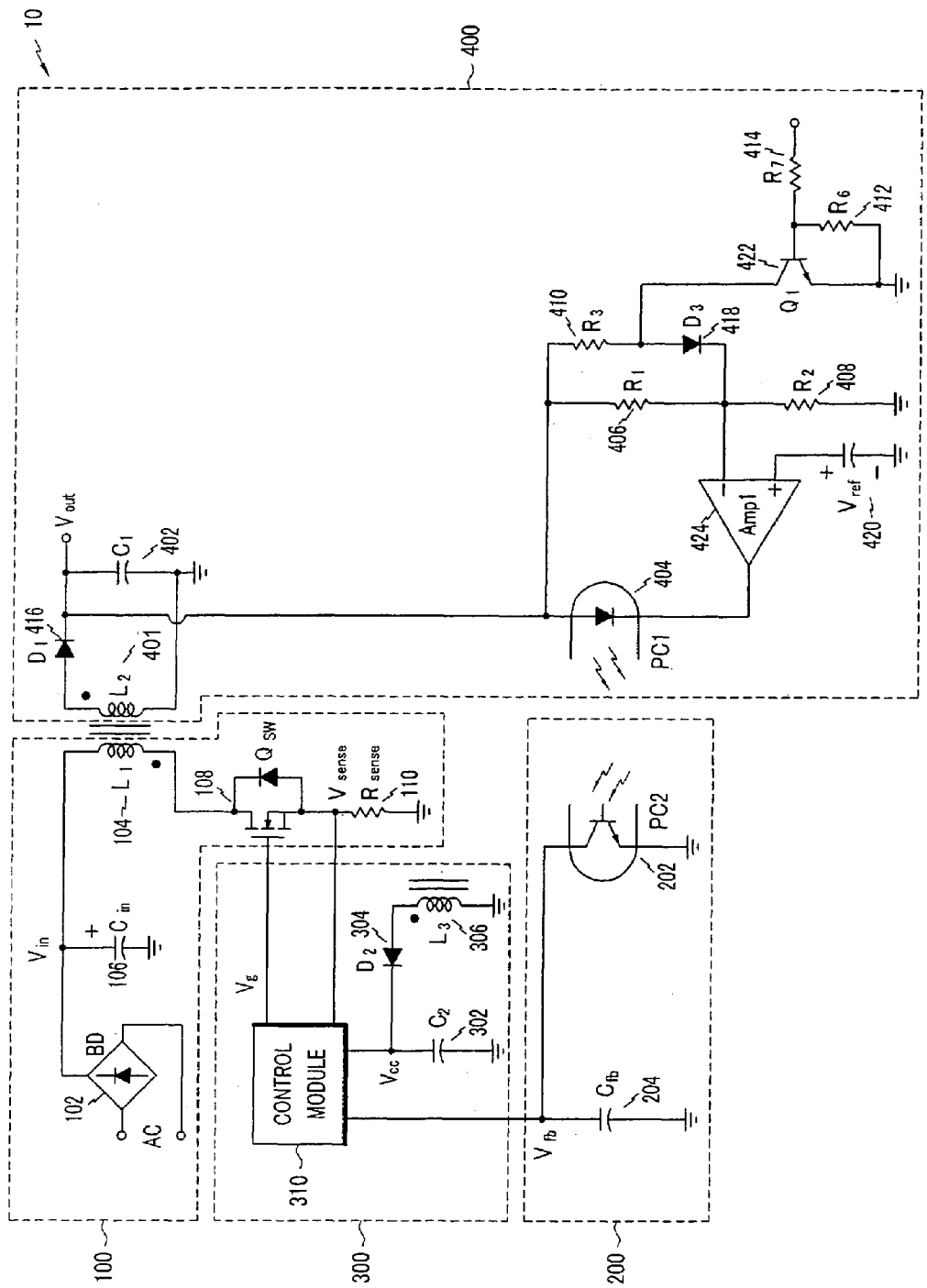
FIG. 1 is a schematic diagram of an exemplary implementation of an SMPS according to an embodiment of the present invention.

FIG. 1 is a schematic diagram of an exemplary implementation of a SMPS 10 according to an embodiment of the present invention.

As depicted, the SMPS 10 includes a power supply unit 100 for power supply, a feedback circuit unit 200 for feedback of an output voltage, a switching control unit 300 for control of switch-on/off operations in the power supply unit 100, and a mode setup unit 400 for setup of an operation mode.

The power supply unit 100 may include a bridge diode circuit BD 102, a primary coil $L_1$ 104, a filter capacitor $C_{in}$ 106, a switching transistor $Q_{SW}$ 108, and a current sense resistor $R_{sense}$ 110. The bridge diode circuit BD 102 operates as a full wave rectifier and outputs a direct current output power. The primary coil $L_1$ 104 can be coupled to a supply voltage of $V_{in}$ and the switching transistor $Q_{SW}$ 108.

A filter capacitor $C_1$ 402 filters current pulses provided by the bridge diode circuit BD 102 to generate the supply voltage to be a substantially direct current voltage. The switching transistor $Q_{SW}$ 108 can be used as a power switch (a main switch) and performs switch-on/off operations under the control of a control module 310 in the switching control unit 300. The current sense resistor $R_{sense}$ 110 provides a current feedback to the control module 310. In this embodiment, a MOSFET is used as the main switch. Other types of switches may also be used as the main switch in other embodiments.

The feedback circuit unit 200 may include a phototransistor $PC_2$ 202 and a capacitor $C_{fb}$ 204. The phototransistor $PC_2$ 202 and a photodiode $PC_1$ 404 of the mode setup unit 400 implement a photocoupler. The phototransistor $PC_2$ 202 can generate a predetermined current depending on an amplitude of current flowing through the photodiode $PC_1$ 404. The capacitor $C_{fb}$ 204, which may have a predetermined amount of charge that varies with the predetermined current generated by the phototransistor $PC_2$ 202, can change a feedback voltage $V_{fb}$ according to the predetermined amount of charge. That is, the feedback voltage $V_{fb}$ may be varied by a voltage of an operation mode set by the mode setup unit 400, and the varied feedback voltage is input to the switching control unit 300.

The switching control unit 300 may include the control module 310, a capacitor $C_2$ 302, a diode $D_2$ 304, and a secondary coil $L_3$ 306. The control module 310 receives a feedback voltage $V_{fb}$, a sense voltage $V_{sense}$ indicative of the amount of current flowing between a drain and source of the transistor $Q_{SW}$ 108, and a charged voltage $V_{CC}$ of the capacitor $C_2$ 302, and generates a switching control signal to control switch-on/off operations of the transistor $Q_{SW}$ 108. The secondary coil $L_3$ 306 receives energy because of switch-on/off operations of the power supply unit 100, and generates current pulses.

The capacitor $C_2$ 302 and the diode $D_2$ 304 rectify the current pulses, and the capacitor $C_2$ 302 and the diode $D_2$ 304 smooth the rectified current pulses such that the substantially direct current supply voltage $V_{CC}$ may be supplied to the control module 310. In this instance, the direct current supply voltage $V_{CC}$ may function as power for supplying a constant voltage to ICs of the SMPS as well as to the control module 310. That is, the direct current supply voltage $V_{CC}$ is used as a current source for driving the ICs (e.g., an IC of the control module 310).

The mode setup unit 400 may include a plurality of resistors $R_1$ 406, $R_2$ 408, $R_3$ 410, $R_6$ 412, and $R_7$ 414, diodes $D_1$ 416 and $D_3$ 418, capacitors $C_1$ 402, reference voltage $V_{ref}$ 420, a transistor $Q_1$ 422, an error amplifier $Amp_1$ 424, and a photodiode $PC_1$ 404. The resistors $R_6$ 412 and $R_7$ 414, the diode $D_3$ 418, and the transistor $Q_1$ 422 may be used to perform the switch-on/off operations. In particular, the resistors $R_6$ 412 and $R_7$ 414 are used to provide an appropriate bias to the transistor $Q_1$ 422. The resistors $R_1$ 406, $R_2$ 408, and $R_3$ 410 are used to determine a mode control voltage $V_a$. The mode control voltage $V_a$ is determined by Equation 1 or 2 depending on whether the operation mode is normal or standby.

Equation 1:

$$V_a = V_{out} \times \frac{R_2}{R_1 + R_2}$$

where $V_a$ is a mode control voltage in the normal operation mode. Equation 1 is satisfied by turning on the transistor $Q_1$ 422 to divide an output voltage of $V_{out}$ by the resistors $R_1$ 406 and $R_2$ 408 in the normal operation mode.

Equation 2:

$$V_a = V_{out} \times \frac{R_2}{(R_1 // R_3) + R_2}$$

where $V_a$ is a mode control voltage in the standby operation mode, and R1//R3 corresponds to $(R_1 \times R_3)/(R_1+R_3)$. The transistor $Q_1$ 422 is turned off in the standby operation mode, and the output voltage of $V_{out}$ is used for determining the mode control voltage of $V_a$, thereby satisfying Equation 2.

An operational amplifier functioning as the error amplifier $Amp_1$ 424 has an inverting input terminal (−) and a non-inverting input terminal (+). The mode control voltage Va is applied to the inverting input terminal (−), and the reference voltage $V_{ref}$ 420 is applied to the non-inverting input terminal (+). The operational amplifier determines whether the photodiode $PC_1$ 404 is operable by comparing the mode control voltage $V_a$ with the reference voltage $V_{ref}$ 420. As described herein, the photodiode $PC_1$ 404 and the phototransistor $PC_2$ 202 of the feedback circuit unit 200 configure a photocoupler. The operational mode of photodiode $PC_1$ 404 is determined by comparing the result of the mode control voltage $V_a$ to the reference voltage $V_{ref}$ 420.

An operation of the above-configured exemplary SMPS will now be described.

In the normal operation mode, the direct current supply voltage $V_{in}$ (generated by full wave rectification of the alternating current input power AC by the bridge diode circuit BD 102) is supplied to the primary coil $L_1$ 104. The supply voltage $V_{in}$ provided to the primary coil $L_1$ 104 causes an output voltage $V_{out}$ to be generated in the secondary coil $L_2$ 401 at a duty cycle defined by the switch-on/off operations of the transistor $Q_{SW}$ 108. The duty cycle can be determined based on a gate driving signal of the switching transistor output from the control module 310. The magnitude of the output voltage $V_{out}$ generated in the secondary coil $L_2$ 401 is large enough to enable the normal operation of an electronic device using the SMPS.

To maintain the output voltage $V_{out}$ at a specific level, it is necessary to control the duty cycle at which the transistor $Q_{SW}$ 108 performs the switch-on/off operations. The output voltage $V_{out}$ is fed back for control of the duty cycle. More specifically, a high signal indicating the normal operation mode is applied to a base of the transistor $Q_1$ 422 to turn on the transistor $Q_1$ 422. When the transistor $Q_1$ 422 is turned on, a reverse bias is applied to the diode $D_3$ 418 to turn off the diode, and the mode control voltage $V_a$ applied to the inverting input terminal (−) of the error amplifier $Amp_1$ 424 is accordingly determined by Equation 1. The error amplifier $Amp_1$ 424 amplifies the mode control voltage $V_a$ to a predetermined level and outputs the result to the photodiode $PC_1$ 404. The current corresponding to a value input to the photodiode $PC_1$ 404 (i.e., the output of the error amplifier $Amp_1$ 424) flows to the phototransistor $PC_2$ 202 because of the photocoupler configured by the photodiode $PC_1$ 404 and the phototransistor $PC_2$ 202.

The current charges the feedback capacitor $C_{fb}$ 204, and the feedback voltage $V_{fb}$ can be determined according to the amount of charge in the feedback capacitor $C_{fb}$ 204. As a result, the feedback voltage $V_{fb}$ is inversely proportional to the mode control voltage $V_a$, and the feedback voltage $V_{fb}$ is input to the control module 310.

The charged voltage $V_{CC}$ of the capacitor $C_2$ 302 can also be input to the control module 310 to function as a power source of the ICs. The supply voltage $V_{in}$ applied to the primary coil $L_1$ 104 in the normal operation mode causes a coil voltage to be generated in the secondary coil $L_3$ 306 of the switching control unit 300, and thus, the charged voltage $V_{CC}$ of the capacitor $C_2$ 302 can be applied to the control module 310. A sense voltage $V_{sense}$ for sensing the current flowing between the drain and source of the transistor $Q_{SW}$ 108 is also input to the control module 310. The control module 310 receives the feedback voltage $V_{fb}$, the charged voltage $V_{CC}$ of the capacitor $C_2$, 302 and the sense voltage $V_{sense}$ and outputs a gate voltage $V_g$ to the gate of the transistor $Q_{SW}$ 108, thereby controlling the switch-on/off operations of the transistor $Q_{SW}$ 108 to maintain the normal operation mode.

In the standby operation mode, the supply voltage $V_{in}$ that is generated by full wave rectification of the alternating current input power AC by the bridge diode circuit BD 102 is supplied to the primary coil $L_1$ 104. The supply voltage $V_{in}$ provided to the primary coil $L_1$ 104 causes the output voltage $V_{out}$ to be generated in the secondary coil $L_2$ 401 at a duty cycle through the switch-on/off operations of the transistor $Q_{SW}$ 108. The duty cycle is determined according to the gate driving signal of the switching transistor 108 output from the control module 310. The output voltage $V_{out}$ generated in the secondary coil $L_2$ 401 is sufficiently large to enable the standby operation of the electronic device using the SMPS, and is smaller than the output voltage $V_{out}$ in the normal operation mode.

To maintain the output voltage $V_{out}$ at a specific level, it is necessary to control the duty cycle at which the transistor $Q_{SW}$ 108 performs the switch-on/off operations in the standby operation mode, similar to the normal operation mode. To control the duty cycle, the output voltage $V_{out}$ is fed back to the switching control unit 300. Specifically, a low signal for indicating the standby operation mode is applied to the base of the transistor $Q_1$ 422 to turn off the transistor $Q_1$ 422, a forward bias is applied to the diode $D_3$ 418 to turn off the diode $D_3$ 418, and the mode control voltage $V_a$ applied to the inverting input terminal (−) of the error amplifier $Amp_1$ 424 is determined by Equation 2. A comparison of Equations 1 and 2 shows that the mode control voltage $V_a$ in the standby operation mode is greater than that in the normal operation mode. The error amplifier $Amp_1$ 424 amplifies the mode control voltage $V_a$ to a level higher than that in the normal operation mode and inputs the amplified mode control voltage $V_a$ to the photodiode $PC_1$ 404. The current corresponding to a current input to the photodiode $PC_1$ 404 from the output current of the error amplifier $Amp_1$ 424 flows to the phototransistor $PC_2$ 202 because of the photocoupler implemented by the photodiode $PC_1$ 404 and the phototransistor $PC_2$ 202. The feedback capacitor $C_{fb}$ 204 is charged with the current, and the feedback voltage $V_{fb}$ is inversely proportional to the mode control voltage $V_a$. Since the mode control voltage $V_a$ in the standby operation mode is greater than that in the normal operation mode, the feedback voltage $V_{fb}$ in the standby operation mode is less than that in the normal operation mode (e.g., substantially near 0V).

The charged voltage $V_{CC}$ of the capacitor $C_2$ 302 and the sense voltage $V_{sense}$ for sensing the current flowing between the drain and source of the switching transistor $Q_{SW}$ 108 can also be supplied to the control module 310. The supply voltage $V_{in}$ provided to the primary coil $L_1$ 104 in the standby operation mode causes a coil voltage to be generated in the secondary coil $L_3$ 306 of the switching control unit 300. Thus, a smaller voltage $V_{CC}$ charged in the capacitor $C_2$ 302 can be applied to the control module 310. In response to the feedback voltage $V_{fb}$, the charged voltage $V_{CC}$ of the capacitor $C_2$, 302 and the sense voltage $V_{sense}$, the control module 310 outputs the gate voltage $V_g$ to the gate of the transistor $Q_{SW}$ 108, thereby controlling the switch-on/off operations of the switching transistor $Q_{SW}$ 108 to maintain the standby operation mode.

Figure 2:
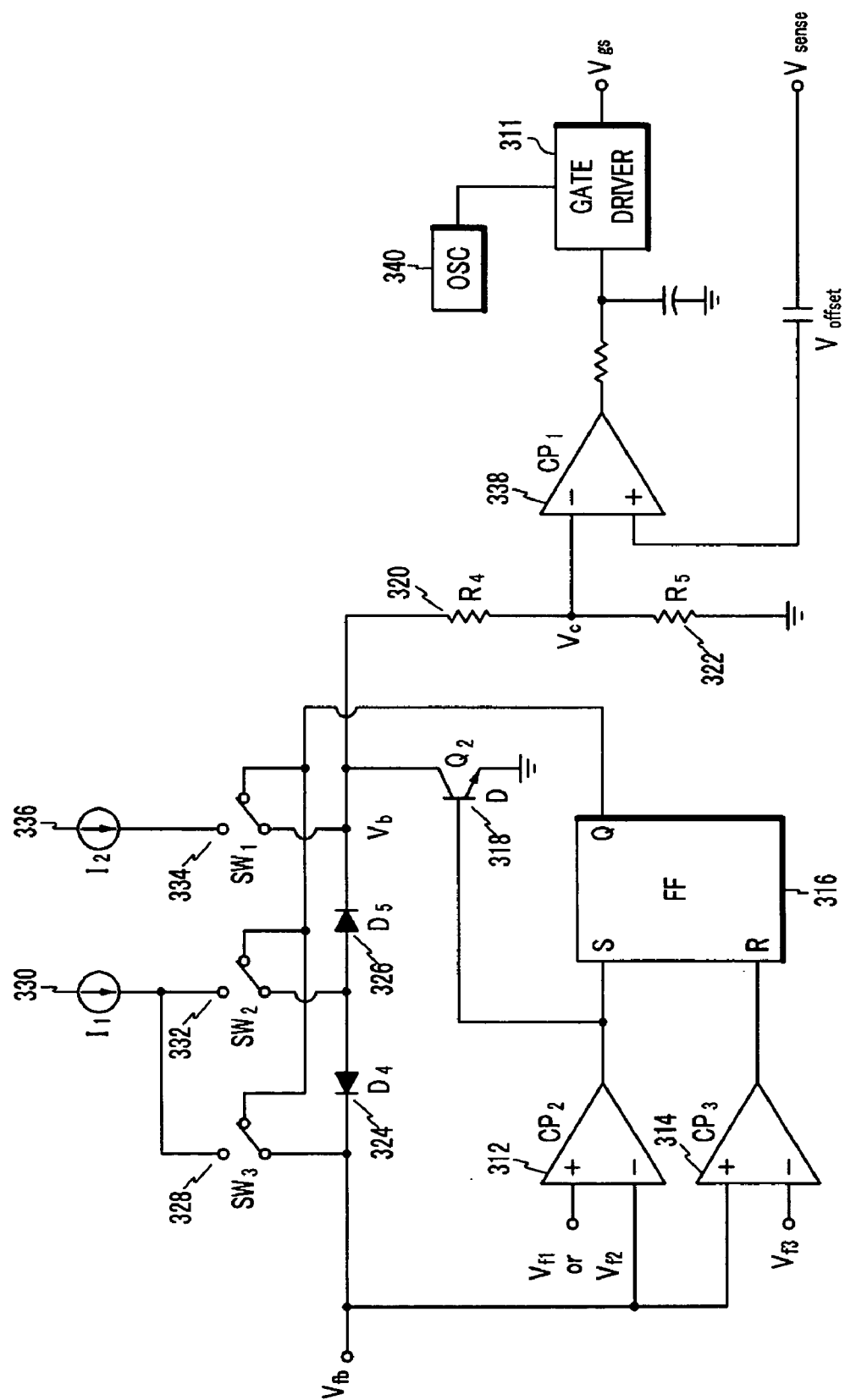
FIG. 2 is a schematic diagram of a first exemplary embodiment for a control module of an SMPS according to an embodiment of the present invention.

FIG. 2 is a circuit diagram of a first exemplary embodiment for a control module of the SMPS according to an embodiment of the present invention.

Referring to FIG. 2, the control module 310 includes a comparator $CP_2$ 312 and a comparator $CP_3$ 314, both of which can be implemented as operational amplifiers. The comparator $CP_2$ 312 receives a feedback voltage $V_{fb}$ through an inverting input terminal (−), and first or second feedback reference voltage $V_{f1}$ or $V_{f2}$ (which is smaller than the feedback voltage $V_{fb}$) through a non-inverting input terminal (+). The comparator $CP_3$ 314 receives a feedback voltage $V_{fb}$ through a non-inverting input terminal (+), and a third feedback reference voltage $V_{f3}$ (which is smaller than the feedback voltage $V_{fb}$) through an inverting input terminal (−).

The output signals of the comparators $CP_2$ 312 and $CP_3$ 314 are input to an S input terminal and an R input terminal of an RS flip-flop FF 316, respectively. The output of the comparator $CP_2$ 312 is also input to a base of a transistor $Q_2$ 318. An emitter of the transistor $Q_2$ 318 is grounded, and a collector of the transistor $Q_2$ 318 is coupled to resistors $R_4$ 320 and $R_5$ 322 in series, and is also coupled to an input terminal of the feedback voltage $V_{fb}$ through diodes $D_4$ 324 and $D_5$ 326. Anodes of the diodes $D_4$ 324 and $D_5$ 326 are coupled to each other, a cathode of the diode $D_4$ 324 is coupled to the input terminal of the feedback voltage $V_{fb}$, and a cathode of the diode $D_5$ 326 is coupled to the collector of the transistor $Q_2$ 318.

A switch $SW_3$ 328 for selectively coupling a first constant current source $I_1$ 330 to an output terminal Q of the RS flip-flop FF 316 may be provided to a node of the input terminal of the feedback voltage $V_{fb}$ and the diode $D_4$ 324. A switch $SW_2$ 332 for selectively coupling the first constant current source $I_1$ 330 to the output terminal Q of the RS flip-flop FF 316 may be provided to a node of the anodes of the diodes $D_4$ 324 and $D_5$ 326. A switch $SW_1$ 334 for selectively coupling a second constant current source $I_2$ 336 to the output terminal Q of the RS flip-flop FF 316 may be provided to a node of the cathode of the diode $D_5$ 326 and the collector of the transistor $Q_2$ 318. In this embodiment, the first and second constant current sources $I_1$ 330 and $I_2$ 336 are generated by the voltage $V_{CC}$ charged in the capacitor $C_2$ 302.

A voltage $V_C$ at a node between the resistors $R_4$ 320 and $R_5$ 322 is input to the inverting input terminal (−) of a comparator $CP_1$ 338. The non-inverting input terminal (+) of the comparator $CP_1$ 338 is coupled to the sense voltage terminal $V_{sense}$ through an offset direct current source $V_{offset}$. The sense voltage $V_{sense}$ is determined according to the current flowing to the switching transistor $Q_{SW}$ 108 and the resistance of a current sense resistor $R_{sense}$ 110. The output of the comparator $CP_1$ 338 is input to a gate driver 311. The gate driver 311 also receives an output of an oscillator OSC 340 and outputs the gate voltage $V_g$. The switch-on/off operations of the switching transistor $Q_{SW}$ 108 are controlled by using the gate voltage $V_g$, and the duty cycle at which the switch-on/off operations are performed is determined by a signal output by the oscillator OSC 340.

Figure 3:
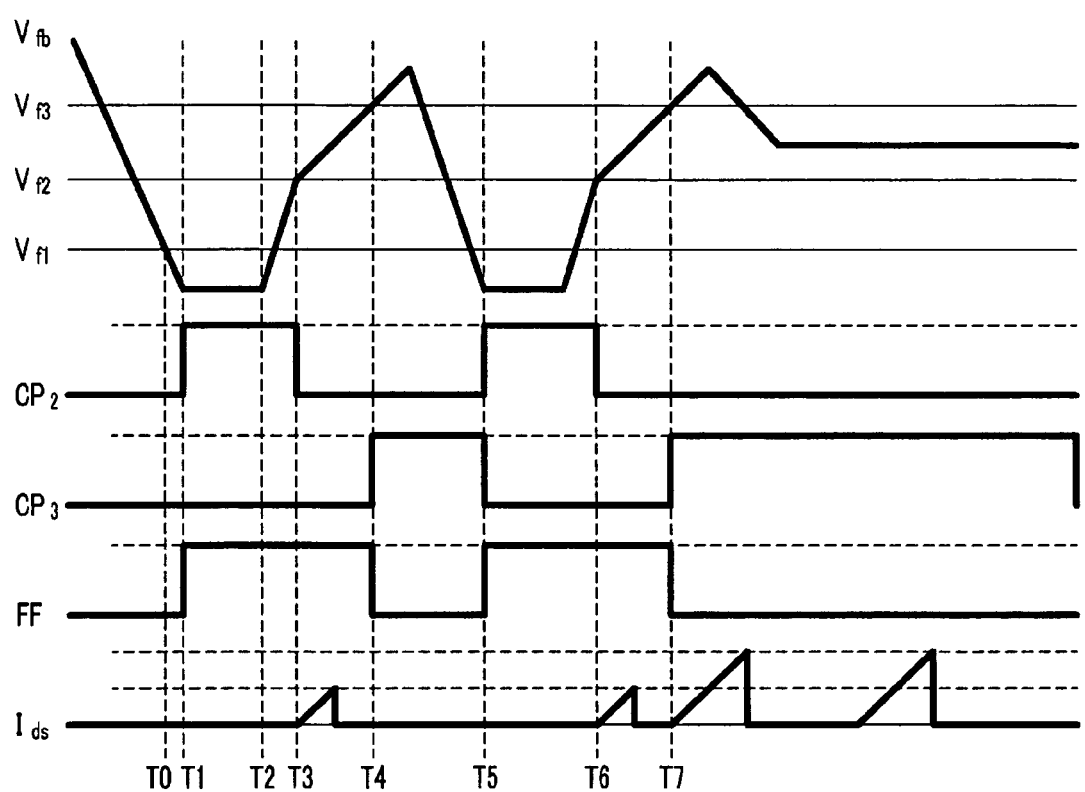
FIGS. 3 and 4 are timing diagrams for exemplary waveforms of voltages of inputs and outputs of the control module of FIG. 2 according to an embodiment of the present invention.
Figure 4:
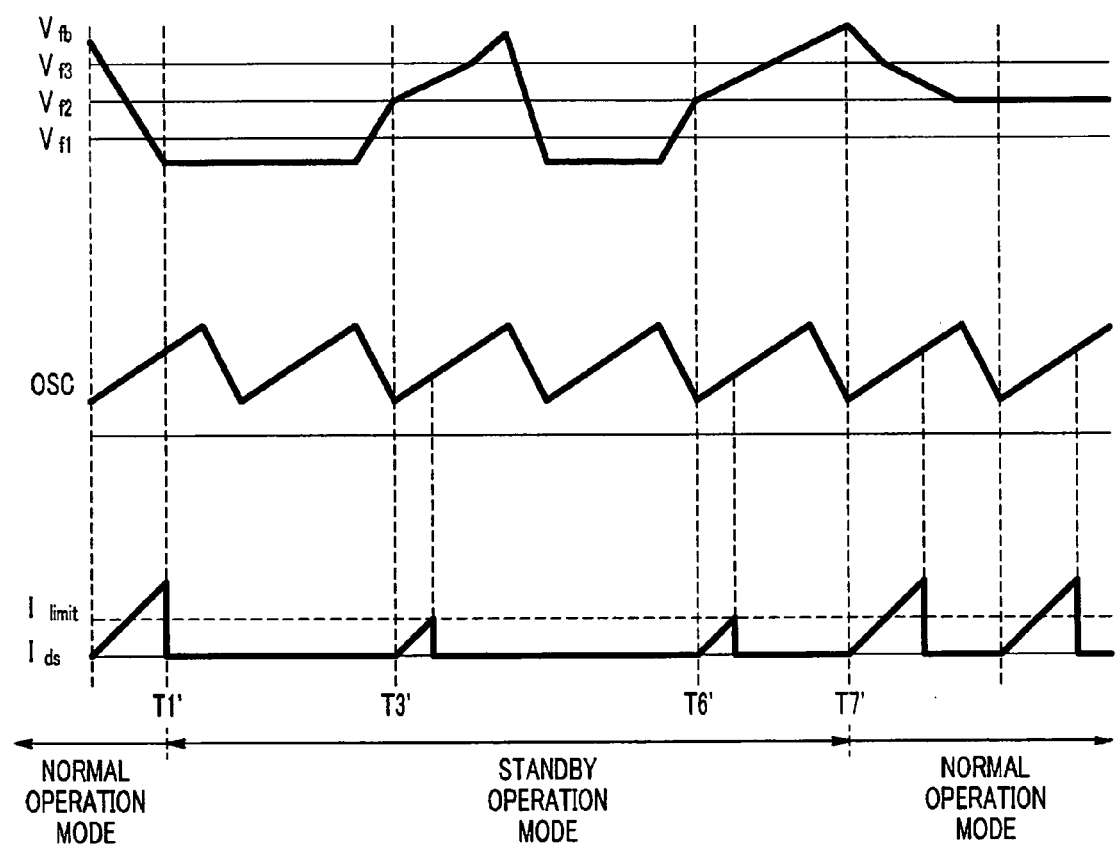

FIGS. 3 and 4 are timing diagrams of exemplary waveforms of voltages of inputs and outputs of the control module 310 of the SMPS shown in FIG. 2.

Referring to FIGS. 3 and 4, when a light load is connected to or applied to the SMPS, the feedback voltage $V_{fb}$ gradually decreases. When the standby operation mode is initiated by a user's manipulation, the feedback voltage $V_{fb}$ input to the control module 310 begins to gradually decrease and reaches substantially 0V (e.g., approximately 0.2V). In detail, the feedback voltage $V_{fb}$ becomes lower than the following: the third feedback reference voltage $V_{f3}$; the second feedback reference voltage $V_{f2}$ after a predetermined time; and the first feedback reference voltage $V_{f1}$ after time T0. At time T1 when the feedback voltage $V_{fb}$ reaches substantially 0V, the second feedback voltage $V_{f2}$ at a high level and the feedback voltage $V_{fb}$ at a low level are input to the non-inverting input terminal (+) and the inverting input terminal (−) of comparator $CP_2$ 312, respectively. Thus, the comparator $CP_2$ 312 outputs a high signal. The high signal output by the comparator $CP_2$ 312 is input to the S input terminal of the RS flip-flop FF 316 and the base of the transistor $Q_2$ 318. The third feedback voltage $V_{f3}$ at a high level and the feedback voltage $V_{fb}$ at a low level are input to the inverting input terminal (−) and the non-inverting input terminal (+) of the comparator $CP_3$ 314, respectively. As a result, the comparator $CP_3$ 314 outputs a low signal. The low signal output by the comparator $CP_3$ 314 is input to the R input terminal of the RS flip-flop FF 316.

The RS flip-flop FF 316, receiving the high and low signals respectively from the comparators $CP_2$ 312 and $CP_3$ 314, outputs a high signal through a Q output terminal thereof. The high signal output by the RS flip-flop FF 316 is maintained for a predetermined time. The transistor $Q_2$ 318 receives the high signal through a base thereof from the comparator $CP_2$ 312 and is turned on. The first to third switches $SW_1$ 334 to $SW_3$ 328 are switched on/off, and hence, a voltage $V_b$ at the node of the diode $D_5$ 326 and the collector of the transistor $Q_2$ 318 becomes substantially 0V, and the current from the first current source $I_1$ 330 flows through the third switch $SW_3$ 328 toward the feedback voltage $V_{fb}$.

Because the voltage $V_b$ is substantially 0V, a low signal is input to the inverting input terminal (−) of the comparator $CP_1$ 338, and the sense voltage $V_{sense}$ at a high level is input to the non-inverting input terminal (+) of the comparator $CP_1$ 338. As a result, the comparator $CP_1$ 338 outputs a high signal. This high signal is input to the gate driver 311, and the gate driver 311 outputs a switch-off signal by using an inverter (not shown) therein. The switching transistor $Q_{SW}$ 108 receives the switch-off signal from the gate driver 311 through the gate thereof and is thus turned off.

The output voltage $V_{out}$ of FIG. 1 begins to decrease from time T2 on, since the switching transistor $Q_{SW}$ 108 performs no switch-on/off operations. As the output voltage $V_{out}$ gradually decreases, the feedback voltage $V_{fb}$ gradually increases. At time T3 when the feedback voltage $V_{fb}$ begins to be greater than the second feedback reference voltage $V_{f2}$, the second feedback reference voltage $V_{f2}$ at a low level is input to the non-inverting input terminal (+) of the comparator $CP_2$ 312, and the feedback voltage $V_{fb}$ at a high level is input to the inverting input terminal (−) of the comparator $CP_2$ 312. The comparator $CP_2$ 312 thus outputs a low signal. By time T3, the feedback voltage $V_{fb}$ at a low level is input to the inverting input terminal (−) of the comparator $CP_3$ 314, and the third feedback reference voltage $V_{f3}$ at a high level is input to the non-inverting input terminal (+) of the comparator $CP_3$ 314. As a result, the comparator $CP_3$ 314 outputs a low signal.

The RS flip-flop FF 316, receiving the low signals respectively from the comparators $CP_2$ 312 and $CP_3$ 314 through the S and R input terminals, continues outputting the high signal through the Q output terminal. The transistor $Q_1$ 422 receives the low signal at the base from the comparator $CP_2$ 312 and is turned off. As a result, the current from the second constant current source $I_2$ 336 flows to the resistors $R_4$ 320 and $R_5$ 322 through the first switch $SW_1$ 334. That is, the voltage $V_b$ at the node of the diode $D_5$ 326 and the collector of the transistor $Q_2$ 318 has a predetermined magnitude, and the voltage $V_C$ at the node of the resistors $R_4$ 320 and $R_5$ 322 has a predetermined voltage of $R_5/(R_4+R_5) \times V_b$. Since the voltage $V_b$ is greater than the sense voltage $V_{sense}$, the comparator $CP_1$ 338 outputs a low signal to the gate driver 311, and the gate driver 311 generates a gate voltage signal to control the switching MOS transistor $Q_{SW}$ 108 in performing the switch-on/off operations. An exemplary current $I_{ds}$ having a triangle waveform flows between the drain and source of the transistor $Q_{SW}$ 108 during the on-state of the transistor $Q_{SW}$ 108. The maximum amplitude of current $I_{ds}$ is determined based on the voltage $V_C$ at the node of the resistors $R_4$ 320 and $R_5$ 322. The voltage $V_C$ can be maintained at a specific level by controlling the second constant current source $I_2$ 336, which allows the maximum amplitude of current $I_{ds}$ to be maintained below a predetermined level. The timings for switch-on/off operations are determined according to waveforms of signals input to the gate driver 311 from the oscillator OSC 340.

At time T4 when the feedback voltage $V_{fb}$ becomes greater than the third feedback reference voltage $V_{f3}$, the output of the comparator $CP_3$ 314 is switched from low to high, and the output of the RS flip-flop FF 316 is switched from high to low. In this instance, the transistor $Q_2$ 318 is turned off. The first switch $SW_1$ 334 is also turned off in response to the low signal output by the RS flip-flop FF 316. Thus, the voltage $V_0$ at the node of the resistors $R_4$ 320 and $R_5$ 322 reaches substantially 0V. As a result, the comparator $CP_1$ 338 outputs a high signal, and the gate driver 311 performs no switch-on/off operations of the switching transistor $Q_{SW}$ 108.

When the transistor $Q_{SW}$ 108 performs no switch-on/off operations, the load on the entire system is reduced, and the feedback voltage $V_{fb}$ begins to decrease again. At time T5 when the feedback voltage $V_{fb}$ is lower than the first feedback reference voltage $V_{in}$, the output of the comparator $CP_2$ 312 is switched from low to high, and the output of the comparator $CP_3$ 314 is switched from high to low. Thus, the transistor $Q_2$ 318 is turned on, and the RS flip-flop FF 316 generates a high signal. The operation of control module 310 after time T5 corresponds to that given after the time T1 and will not be repeated. In a similar manner, the operation of control module 310 after time T6 at which the feedback voltage $V_{fb}$ begins to be greater than the second feedback reference voltage $V_{f2}$ corresponds to that given after time T3, and will not be repeated.

The feedback voltage $V_{fb}$ temporarily becomes greater than the third feedback reference voltage $V_{f3}$ and is reduced again to maintain a predetermined value which is greater than the second feedback reference voltage $V_{f2}$ and less than the third feedback reference voltage $V_{f3}$ at time T7 when the normal operation mode starts after the standby operation mode for a predetermined time is finished. The output of the comparator $CP_2$ 312 is maintained at a low level during the normal operation mode, and the output of the comparator $CP_3$ 314 is maintained at a high level. The output of the RS flip-flop FF 316 is maintained at a low level.

Referring to FIGS. 2 and 4, since the voltage $V_C$ at the node of the resistors $R_4$ 320 and $R_5$ 322 is substantially 0V from time T1 when the normal operation mode is switched to the standby operation mode to time T2 when the transistor $Q_{SW}$ 108 is turned on, the transistor $Q_{SW}$ 108 will perform no switch-on/off operations even when an output from the oscillator OSC 340 is input to the gate driver 311. However, the transistor $Q_{SW}$ 108 performs the switch-on/off operations from time T3 when the voltage $V_C$ at the node is maintained at a specific level according to a variation of the feedback voltage $V_{fb}$. Thereafter, the timings for switch-on/off operations are determined based on the output from the oscillator OSC 340. That is, while the output signal from the oscillator OSC 340 increases, the transistor $Q_{SW}$ 108 is turned on and the current $I_{ds}$ between the drain and source of the transistor $Q_{SW}$ 108 is generated. As described above, the current $I_{ds}$ does not exceed a maximum limit of current $I_{limit}$ in the standby operation mode since the voltage $V_C$ at the node is maintained at a predetermined level.

When the feedback voltage $V_{fb}$ is greater than the third feedback reference voltage $V_{f3}$ after time T3, the voltage $V_C$ at the node of the resistors $R_4$ 320 and $R_5$ 322 becomes substantially 0V. Thus, the transistor $Q_{SW}$ 108 performs no switch-on/off operations even when the output from the oscillator OSC 340 is input to the gate driver 311. The operation after time T6 corresponds to time T3, and thus will not be repeated.

The transistor $Q_{SW}$ 108 performs the switch-on/off operations from time T7 when the standby operation mode is switched to the normal operation mode. The duty cycle is determined based on an exemplary waveform of the voltage of the output from the oscillator OSO 340.

Figure 5:
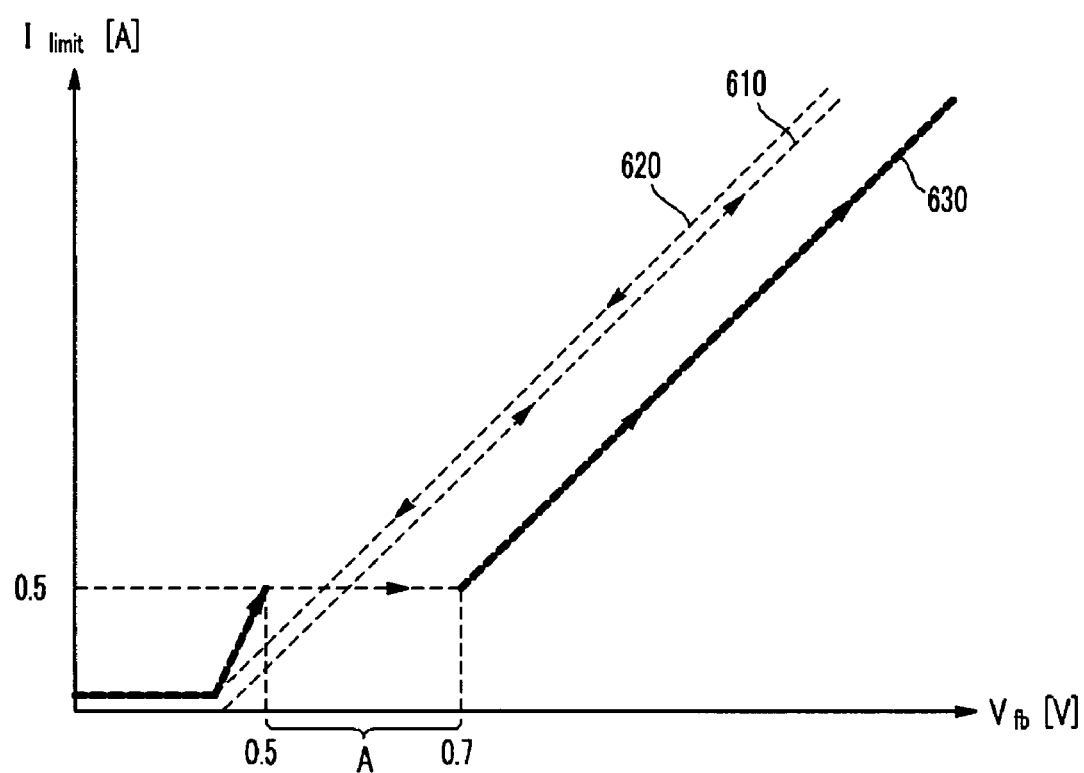
FIG. 5 is a graph of an exemplary relationship between a feedback voltage $V_{fb}$ and a maximum amplitude of current $I_{limit}$ flowing between a drain and source of a transistor in the control module of FIG. 2.

FIG. 5 is a graph of an exemplary relationship between a feedback voltage $V_{fb}$ and a maximum amplitude of the current $I_{limit}$ flowing between a drain and source of the transistor $Q_{SW}$ 108 in the control module 310 of FIG. 2.

Referring to FIG. 5, when the feedback voltage $V_{fb}$ increases, the maximum amplitude of the current $I_{limit}$ increases linearly (see the reference numeral 610). When the feedback $V_{fb}$ decreases, the maximum amplitude of current $I_{limit}$ also decreases linearly (see the reference numeral 620). However, when the feedback voltage $V_{fb}$ increases again, particularly when the feedback voltage $V_{fb}$ increases within the range between 0.5 and 0.7V, the maximum amplitude of the current $I_{limit}$ is maintained at a specific level, e.g., 0.5 A. When the feedback voltage $V_{fb}$ increases to be out of range A from 0.5 to 0.7V, the maximum amplitude of the current $I_{limit}$ increases linearly again (see the reference numeral 630). In this instance, the lines 610 and 620 indicate the relation between the feedback voltage $V_{fb}$ and maximum amplitude of the current $I_{limit}$ when not using the standby operation mode, and the line 630 indicates the relation between the feedback voltage $V_{fb}$ and maximum amplitude of the current $I_{limit}$ when using the standby operation mode.

Figure 6:
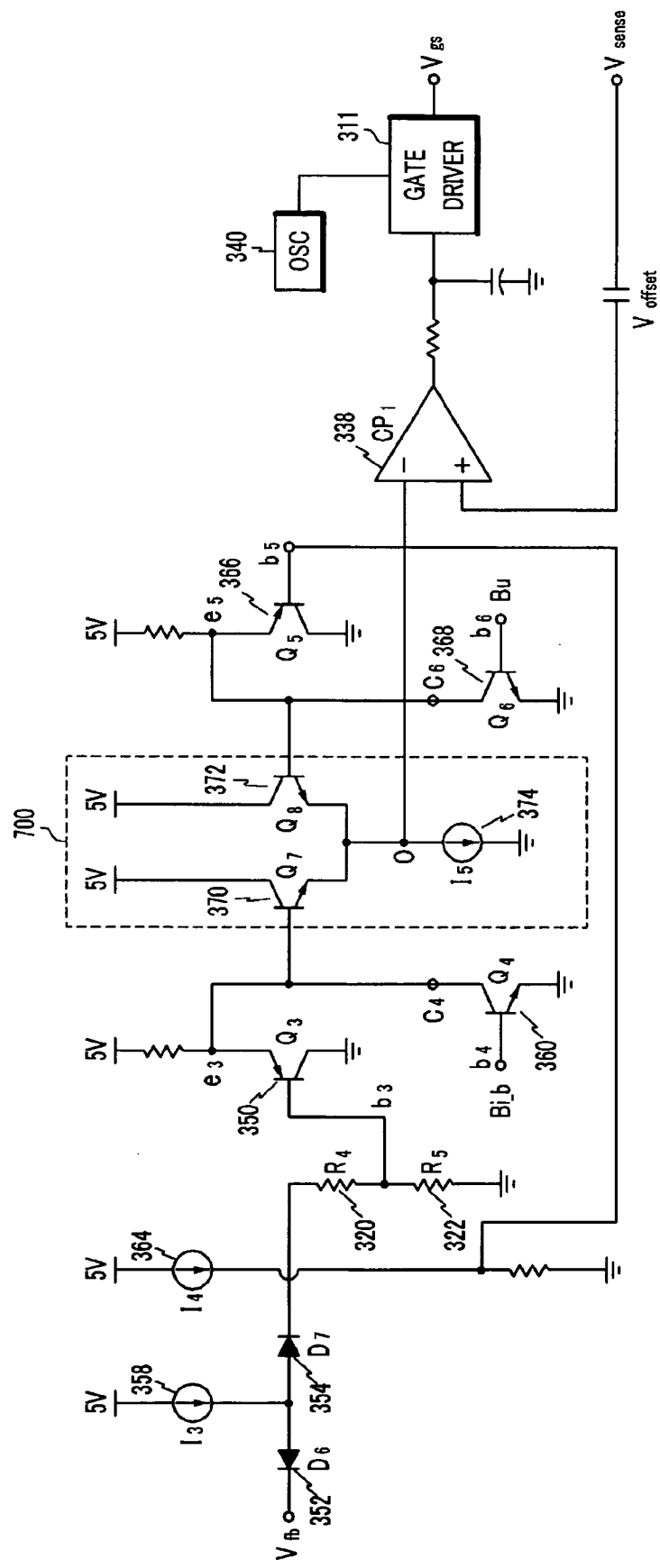
FIGS. 6 and 7 are schematic diagrams of a second exemplary embodiment for a control module of an SMPS according to an embodiment of the present invention.
Figure 7:
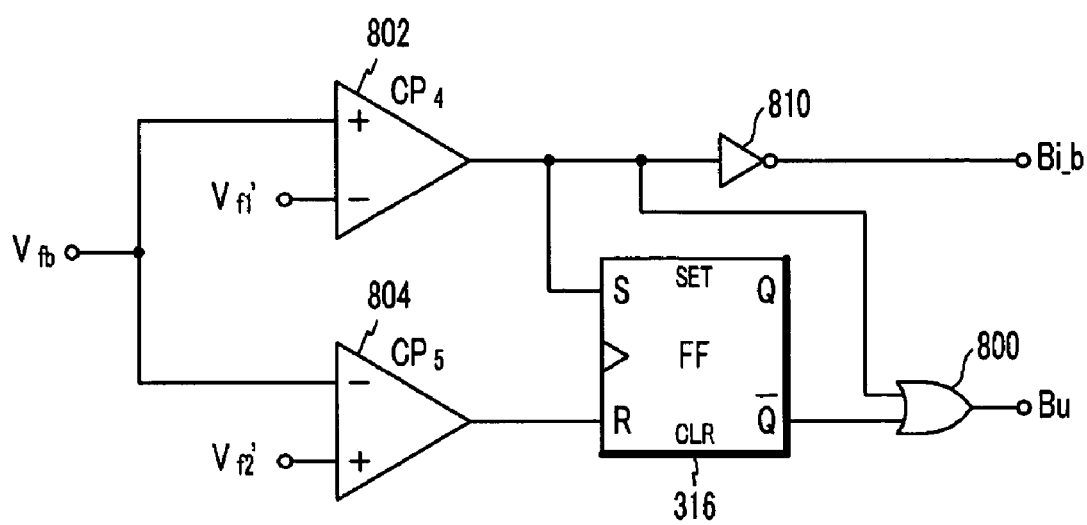

FIGS. 6 and 7 are schematic diagrams of a second exemplary embodiment for a control module of an SMPS according to an embodiment of the present invention.

Referring to FIG. 6, the input terminal of the feedback voltage $V_{fb}$ of the control module 310 of FIG. 1 can be coupled to a base $b_3$ of a pnp bipolar junction transistor $Q_3$ 350 through diodes $D_6$ 352 and $D_7$ 354 (coupled in series) and a resistor $R_4$ 320. An anode of the diode $D_6$ 352 and a cathode of the diode $D_7$ 354 face the input terminal of the feedback voltage $V_{fb}$ of the control module 310. A cathode of the diode $D_6$ 352 and an anode of the diode $D_7$ 354 face the transistor $Q_3$ 350. Thus, the diode $D_6$ 352 and the diode $D_7$ 354 are arranged in opposite directions, and a node of the diode $D_6$ 352 and the diode $D_7$ 354 can be coupled to a current source $I_3$ 358.

An emitter $e_3$ of the transistor $Q_3$ 350 can be coupled to both a selector circuit 700 and a collector $c_4$ of an npn bipolar junction transistor $Q_4$ 360. The base $b_3$ of the transistor $Q_3$ 350 can be coupled to a node of the resistors $R_4$ 320 and $R_5$ 322, and the resistors $R_4$ 320 and $R_5$ 322 are coupled in series between the cathode of the diode $D_7$ 354 and the ground. A burst current limit signal Bi_b is input to a base $b_4$ of the transistor $Q_4$ 360 and an emitter of the transistor $Q_4$ 360 is grounded.

A current source $I_4$ 364, separate from the current source $I_3$ 358, can be coupled to a base $b_5$ of a pnp bipolar junction transistor $Q_5$ 366. An emitter $e_5$ of the transistor $Q_5$ 366 is coupled to both the selector circuit 700 and a collector $c_6$ of an npn bipolar junction transistor $Q_6$ 368. A normal operation signal Bu is input to a base $b_6$ of the transistor $Q_6$, 368 and an emitter of the transistor $Q_6$ 368 is grounded.

The selector circuit 700 comprises two npn bipolar junction transistors $Q_7$ 370 and $Q_8$ 372 and a current source $I_5$ 374. A base of the transistor $Q_7$ 370 can be coupled to the emitter $e_3$ of the transistor $Q_3$ 350 and the collector $c_4$ of the transistor $Q_4$ 360. A base of the transistor $Q_8$ 372 is coupled to the emitter $e_5$ of the transistor $Q_5$ 366 and the collector $c_6$ of the transistor $Q_6$ 368. The emitter of the transistor $Q_7$ 370 and the emitter of the transistor $Q_8$ 372 are coupled to each other and is also coupled to an output terminal o of the selector circuit 700. The output terminal o of the selector circuit 700 is grounded through the constant current source $I_5$ 374 inside the selector circuit 700, and it is coupled to an inverting input terminal of the comparator $CP_1$ 338 outside the selector circuit 700.

A non-inverting input terminal of the comparator $CP_1$ 338 (having an inverting input terminal coupled to the output terminal o of the selector circuit 700) can be coupled to the sense voltage terminal $V_{sense}$ through the offset DC voltage source $V_{offset}$. The sense voltage $V_{sense}$ is, as shown in FIG. 1, determined by the current flowing to the switching transistor $Q_{SW}$ 108 and resistance of the current sense resistor $R_{sense}$ 110. The output of the comparator $CP_1$ 338 is input to the gate driver 311. The gate driver 311 receives the output from the oscillator OSC 340 in addition to the output of the comparator $CP_1$ 338 and outputs a gate voltage $V_g$. The switching transistor $Q_{SW}$ 108 is switched on/off by the gate voltage $V_g$. A duty cycle of the switch-on/off operations is determined based on the signal output by the oscillator OSC 340.

An operation of the control module 310 according to a second exemplary embodiment will be described.

A voltage at the base $b_3$ of the transistor $Q_3$ 350 can be maintained at the feedback voltage $V_{fb}$ by the constant current source $I_3$ 358. The feedback voltage $V_{fb}$ is level-shifted to the emitter $e_3$ of the transistor $Q_3$ 350. In this instance, the voltage at the base $b_3$ corresponds to the distributed voltage $V_{fb}*R_4/(R_4+R_5)$ by the resistors $R_4$ 320 and $R_5$ 322, but the distributed voltage will be assumed to be the feedback voltage $V_{fb}$ for ease of description hereinafter. The voltage at the base $b_5$ of the transistor $Q_5$ 366 can be maintained at the feedback voltage $V_{fb}$ by the constant current source $I_4$ 364, and hence, the feedback voltage $V_{fb}$ is level-shifted to the emitter $e_5$. The voltage at the emitter $e_3$ of the transistor $Q_3$ 350 and the voltage at the emitter $e_5$ of the transistor $Q_5$ 366 are selectively input to the selector circuit 700. In this instance, either one or none of the voltages are input thereto; it is not the case that both the voltages are simultaneously input thereto.

Whether or not the voltage at the emitter $e_3$ of the transistor $Q_3$ 350 is input to the selector circuit 700 is determined by the burst current limit signal Bi_b. In particular, when the burst current limit signal Bi_b is high, the transistor $Q_4$ 360 is turned on, and the voltage at the emitter $e_3$ of the transistor $Q_3$ 350 is not input to the selector circuit 700. On the other hand, when the burst current limit signal Bi_b is low, the transistor $Q_4$ 360 is turned off, and the voltage at the emitter $e_3$ of the transistor $Q_3$ 350 is input to the selector circuit 700.

The voltage at the emitter $e_3$ of the transistor $Q_3$ 350 is input to the base of the transistor $Q_7$ 370 inside the selector circuit 700. In a similar manner, the voltage at the emitter $e_5$ of the transistor $Q_5$ 366 is input to the base of the transistor $Q_8$ 372 inside the selector circuit 700. Either the transistor $Q_7$ 370 or the transistor $Q_8$ 372 inside the selector circuit 700 is turned on. That is, either the voltage at the emitter $e_3$ of the transistor $Q_3$ 350 or the voltage at the emitter $e_5$ of the transistor $Q_5$ 366 is input to the selector circuit 700. When the voltage at the emitter $e_3$ of the transistor $Q_3$ 350 is input to the selector circuit 700, the voltage at the emitter $e_3$ is provided to the emitter of the transistor $Q_7$ 370 and is then output outside the selector circuit 700 through the output terminal o of the selector circuit 700. Similarly, when the voltage at the emitter $e_5$ of the transistor $Q_5$ 366 is input to the selector circuit 700, the voltage at the emitter $e_5$ thereof is provided to the emitter of the transistor $Q_8$ 372 and is then output outside the selector circuit 700 through the output terminal o of the selector circuit 700.

The output of the selector circuit 700 is fed to the inverting input terminal of the comparator $CP_1$ 338, and the sense voltage $V_{sense}$ is input to the non-inverting input terminal of the comparator $CP_1$ 338. The sense voltage $V_{sense}$ is, as shown in FIG. 1, determined according to the current flowing through the switching transistor $Q_{SW}$ 108 and resistance of the current sense resistor $R_{sense}$ 110. The comparator $CP_1$ 338 compares the output of the selector circuit 700 with the sense voltage $V_{sense}$ and outputs a comparison result to the gate driver 311. The gate driver 311 receives a signal from the oscillator OSC 340 that determines a duty cycle of the switch-on/off operations in addition to the output of the comparator $CP_1$ 338, and outputs the gate voltage $V_g$.

Referring to FIG. 7, comparators $CP_4$ 802 and $CP_5$ 804 are arranged in parallel. The comparator $CP_4$ 802 receives the feedback voltage $V_{fb}$ through its non-inverting input terminal (+) and a first feedback reference voltage $V_{f1}'$ through its inverting input terminal (−). The comparator $CP_5$ 804 receives the feedback voltage $V_{fb}$ through its inverting input terminal (−) and a second feedback reference voltage $V_{f2}'$ through its non-inverting input terminal (+).

The output of the comparator $CP_4$ 802 is inverted by an inverter 810 and is then used as a burst current limit signal Bi_b that is input to the base $b_4$ of the transistor $Q_4$ 360. The output of the comparator $CP_4$ 802 for outputting the burst current limit signal Bi_b and the output of the comparator $CP_5$ 804 are input to the S input terminal and the R input terminal of the RS flip-flop FF 316, respectively. Also, the output terminal of the comparator $CP_4$ 802 is coupled to an input terminal of an OR gate 800 as well as to the S input of the RS flip-flop FF 316. Another input terminal of the OR gate 800 is coupled to an output terminal $\overline{Q}$ of the RS flip-flop FF 316.

The normal operation signal Bu is output from the output terminal of the OR gate 800 and is input to the base $b_6$ of the npn bipolar junction transistor $Q_6$ 368. Logic states of the circuit shown in FIG. 7 are determined based on the input feedback voltage $V_{fb}$. Output signals of circuit elements with respect to the feedback voltage $V_{th}$ are shown in Table 1.

TABLE 1

| | $CP_4$ | $CP_5$ | Bu | Bi_b | $\overline{Q}$ |
|---|---|---|---|---|---|
| Normal operation mode | H | L | H | L | L |
| $V_{f1}' \geq V_{fb} \geq V_{f2}'$ | L | L | L | H | L |
| $V_{fb} \leq V_{f2}'$ | L | H | H | H | H |
| $V_{f2}' \leq V_{fb} \leq V_{f1}'$ | L | L | H | H | H |

An operation of the exemplary circuit of FIG. 7 will be described with reference to Table 1. First, in a normal operation mode where the feedback voltage $V_{fb}$ is greater than the first feedback reference voltage $V_{f1}'$, the output of the comparator $CP_4$ 802 is high (H) and the output of the comparator $CP_5$ 804 is low (L). The output signal of the comparator $CP_4$ 802 is inverted into a low (L) signal by the inverter 810 and is generated as a burst current limit signal Bi_b of the low signal (L). The high signal (H) output from the comparator $CP_4$ 802 and the low signal (L) output from the comparator $CP_5$ 804 are input to the S input terminal and the R input terminal of the RS flip-flop FF 316, respectively. A low signal (L) is output from the output terminal $\overline{Q}$ of the RS flip-flop FF 316 having received the high signal (H) and the low signal (L) from the comparators $CP_4$ 802 and $CP_5$ 804, and is input to an input terminal of the OR gate 800. The high signal (H) output from the comparator $CP_4$ 802 is input to another input terminal of the OR gate 800. The OR gate 800, having received the low signal (L) and the high signal (H), outputs a high signal (H) and a normal operation signal Bu of the high signal (H).

Next, in an exemplary burst mode where the feedback voltage $V_{fb}$ gradually decreases to be less than the first feedback reference voltage $V_{f1}'$ and greater than the second feedback reference voltage $V_{f2}'$, the comparators $CP_4$ 802 and $CP_5$ 804 output low signals (L). The output signal of the comparator $CP_4$ 802 is inverted into a high signal (H) by the inverter 810 and is generated as a burst current limit signal Bi_b of high (H) value. The low signals (L) output from the comparators $CP_4$ 802 and $CP_5$ 804 are input to the S input terminal and the R input terminal of the RS flip-flop FF 316, respectively. A low signal (L) is output from the output terminal $\overline{Q}$ of the RS flip-flop FF 316 having received the low signals (L) from the comparators $CP_4$ 802 and $CP_5$ 804, and is input to one terminal of the OR gate 800. The low signal (L) output from the comparator $CP_4$ 802 is input to another terminal of the OR gate 800, and the OR gate 800 then outputs a low signal (L), and thus generates a normal operation signal Bu of the low signal (L).

Next, when the feedback voltage $V_{fb}$ is further reduced to be less than the second feedback reference voltage $V_{f2}'$, the comparator $CP_4$ 802 outputs a low signal (L) and the comparator $CP_5$ 804 outputs a high signal (H). The low signal (L) of the comparator $CP_4$ 802 is inverted into a high signal (H) by the inverter 800 and is generated as the burst current limit signal Bi_b of the high signal (H). The low signal (L) output from the comparator $CP_4$ 802 and the high signal (H) output from the comparator $CP_5$ 804 are input to the S input terminal and the R input terminal of the RS flip-flop FF 316, respectively. A high signal (H) is output from the output terminal $\overline{Q}$ of the RS flip-flop FF 316 having received the low signal (L) and the high signal (H), and is input to the input terminal of the OR gate 800. The low signal (L) output from the comparator $CP_4$ 802 is input to the other input terminal of the gate 800. The OR gate 800, having received the high signal (H) and the low signal (L), outputs a high signal (H) and generates a normal operation signal Bu of the high signal (H).

When the feedback voltage $V_{fb}$ increases again to be less than the first feedback reference voltage $V_{f1}'$ and greater than the second feedback reference voltage $V_{f2}'$, the comparators $CP_4$ 802 and $CP_5$ 804 output low signals (L). The output signal (L) of the comparator $CP_4$ 802 is inverted into a high signal (H) by the inverter 800, and is generated as a burst current limit signal Bi_b of the high signal (H). The low signals (L) output from the comparators $CP_4$ 802 and $CP_5$ 804 are input to the S input terminal and the R input terminal of the RS flip-flop FF 316 respectively, and a high signal (H) is output from the output terminal $\overline{Q}$ of the RS flip-flop FF 316 having received the low signals (L) and is input to one input terminal of the OR gate 800. The low signal (L) output from the comparator $CP_4$ 802 is input to the other input terminal of the gate 800. The OR gate 800 then outputs a high signal (H) and generates a normal operation signal Bu of the high signal (H).

As described above, both the burst current limit signal Bi_b and the normal operation signal Bu can be high (H) at the same time, but both cannot be low (L) at the same time.

When the burst current limit signal Bi_b and the normal operation signal Bu are high (H), no signal is input to the selector circuit 700 of FIG. 6. When the burst current limit signal Bi_b and the normal operation signal Bu are low (L), two signals are simultaneously input to the selector circuit 700 of FIG. 6. Accordingly, it is possible that no signal is input to the selector circuit 700, but it is not possible that two signals are simultaneously input to the selector circuit 700.

Figure 8:
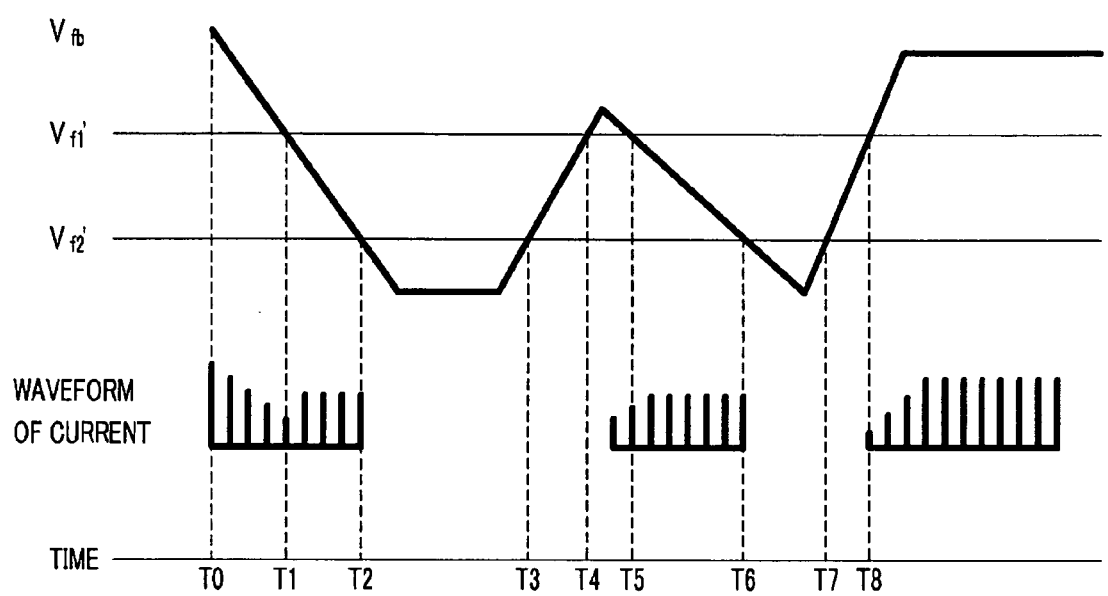
FIG. 8 is a timing diagram for exemplary waveforms of voltages of inputs and outputs of the control module of FIGS. 6 and 7 according to an embodiment of the present invention.

FIG. 8 is a timing diagram of exemplary waveforms for input and output signals of the control module 310 of FIGS. 6 and 7, according to an embodiment of the present invention.

Referring to FIGS. 6 to 8, when a lesser load is given to the entire system, the feedback voltage $V_{fb}$ begins to decrease. When the feedback voltage $V_{fb}$ becomes less than the first feedback reference voltage $V_{f1}'$, the control module 310 operates in the burst current limit mode because the burst mode and the normal operation mode are distinguished based on the first feedback reference voltage $V_{f1}'$. In other words, the control module 310 operates in the normal operation mode when the feedback voltage $V_{fb}$ is greater than the first feedback reference voltage $V_{f1}'$. The control module 310 operates in the burst mode in which the current is limited when the feedback voltage $V_{fb}$ is less than the first feedback reference voltage $V_{f1}'$. The feedback voltage $V_{fb}$ is reduced to be less than the second feedback reference voltage $V_{f2}'$ after a period of time has passed.

In this instance, the control module 310 does not perform the switch-on/off operations because the second feedback reference voltage $V_{f1}'$ is used as a reference voltage for determining whether to perform the switch-on/off operations. That is, the switch-on/off operations are performed when the feedback voltage $V_{fb}$ is greater than the second feedback reference voltage $V_{f1}'$, but no switch-on/off operations are performed when the feedback voltage $V_{fb}$ is less than the second feedback reference voltage $V_{f1}'$.

In further detail, in the period from time T0 to time T1, the control module 310 operates in the normal operation mode. In this instance, a high signal (H) and a low signal (L) are input to a non-inverting input terminal of the comparator CP$_4$ 802 and an inverting input terminal of the comparator CP$_5$ 804, respectively, and the burst current limit signal Bi_b of the low signal (L) and the normal operation signal Bu of the high signal (H) are generated by the operation of the control module 310 of FIG. 7. As a result, in FIG. 6 the voltage at the emitter $e_3$ of the pnp bipolar junction transistor Q$_3$ 350 is input to the selector circuit 700, is then output from the selector circuit 700 to the inverting input terminal of the comparator CP$_1$ 338, and is then generated by the gate driver 311 as a gate control signal $V_g$ for performing the switch-on/off operations in the normal operation mode. Since the voltage at the emitter $e_3$ thereof is proportional to the feedback voltage $V_{fb}$, an output current (flowing through the switching transistor Q$_{SW}$ 108) is varied in proportion to the feedback voltage $V_{fb}$. Thus, both the feedback voltage $V_{fb}$ and the output current gradually decrease during the above-noted period.

In the period from time T1 to time T2, the control module 310 operates in the burst current limit mode. The low signals (L) are input to the non-inverting input terminal of the comparator CP$_4$ 802 and the inverting input terminal of the comparator CP$_5$ 804, respectively, and the burst current limit signal Bi_b of high (H) and the normal operation signal Bu of low (L) are generated by the operation of the control module 310 of FIG. 7. As a result, in FIG. 6 the voltage at the emitter $e_5$ of the transistor Q$_5$ 366 is input to the selector circuit 700, is then output from the selector circuit 700 and input to the inverting input terminal of the comparator CP$_1$ 338, and is generated by the gate driver 311 as a gate control signal $V_g$ for performing the switch-on/off operations in the burst current limit mode. Since the voltage at the emitter $e_5$ of the transistor Q$_5$ 366 is proportional to a specific voltage generated by the current source I$_4$ 364, an output current is maintained in proportion to the voltage of the specific amplitude. As a result, the output current is maintained at a specific level in proportion to the specific voltage. Thus, the output current (flowing through the switching transistor Q$_{SW}$ 108) is controlled to be below a predetermined level and is then maintained at a specific level when the feedback voltage $V_{fb}$ gradually decreases during the period from time T$_1$ to time T$_2$.

In the period from time T2 to time T3, the control module 310 performs no switch-on/off operations. The low signal (L) and the high signal (H) are input to the non-inverting input terminal of the comparator CP$_4$ 802 and the inverting input terminal of the comparator CP$_5$ 804, respectively, and the burst current limit signal Bi_b of the high signal (H) and the normal operation signal Bu of the high signal (H) are generated by the operation of the control module 310 of FIG. 7. Thus, in FIG. 6 neither the voltage at the emitter $e_3$ of the transistor Q$_3$ 350 nor the voltage at the emitter $e_5$ of the transistor Q$_5$ 366 are input to the selector circuit 700, and no gate control signal $V_g$ is generated by the gate driver 311.

In the period from time T3 to time T4, the control module 310 performs no switch-on/off operations. The low signals (L) are input to the non-inverting input terminal of the comparator CP$_4$ 802 and the inverting input terminal of the comparator CP$_5$ 804, and the burst current limit signal Bi_b of the high signal (H) and the normal operation signal Bu of the high signal (H) are generated by the operation of the control module 310 of FIG. 7. Different from the period from time T1 to time T2, the normal operation signal Bu of the high signal (H) is generated because of the RS flip-flop FF 316 in FIG. 7. As a result, no gate control signal $V_g$ is generated by the gate driver 311 since neither the voltage at the emitter $e_3$ of the transistor Q$_3$ 350 nor the voltage at the emitter $e_5$ of the transistor Q$_5$ 366 is input to the selector circuit 700.

In the period from time T4 to time T5, when no presence of an external load, but a decrease of the external load, is sensed, the feedback voltage $V_{fb}$ begins to decrease again. The operation by the control module 310 from time T5 to time T6 (during which the feedback voltage $V_{fb}$ decreases to be less than the first feedback reference voltage $V_{f1}'$), the operation by the same from time T6 to time T7 (during which the feedback voltage $V_{fb}$ is less than the second feedback reference voltage $V_{f2}'$) and the operation by the same from time T7 to time T8 (during which the feedback voltage $V_{fb}$ increases again to be greater than the second feedback reference voltage $V_{f1}'$) correspond to the operation by the control module 310 from time T1 to time T2, the operation by the control module 310 from time T2 to time T3, and the operation by the control module 310 from time T3 to time T4, respectively. At time T8 where the feedback voltage $V_{fb}$ is greater than the first feedback reference voltage $V_{f1}'$, the control module 310 operates in the normal operation mode as long as no decrease in the external load is sensed.

The operation of the control module 310 according to the first exemplary embodiment is determined by comparing three feedback reference voltages $V_{f1}$, $V_{f2}$, and $V_{f3}$ with the feedback voltage $V_{fb}$. The operation of the control module 310 according to the second exemplary embodiment is determined by comparing two feedback reference voltages $V_{f1}'$ and $V_{f2}'$ with the feedback voltage $V_{fb}$, and hence, power consumption for switching the mode from the burst mode to the normal operation mode is reduced. This allows for a simpler internal circuit design.

However, when the feedback voltage $V_{fb}$ is less than the second feedback reference voltage $V_{f2}'$ (at time T2 of FIG. 8), when the switching transistor $Q_{SW}$ 108 performs no switch-on/off operation in the control module 310 according to the first exemplary embodiment, the direct current supply voltage $V_{CC}$ supplied to the secondary coil $L_3$ 306 and the capacitor $C_2$ 302 in FIG. 1 is gradually decreased to be less than an under voltage lock out (UVLO). Thus, the output voltage is inappropriately regulated. In particular, when the feedback voltage $V_{fb}$ is given to be less than the second feedback reference voltage $V_{f2}'$, the switching transistor $Q_{SW}$ 108 performs no switching operation so that no current flows through the switching MOS transistor $Q_{SW}$ 108 and no energy is transmitted to the direct current supply voltage $V_{CC}$. Since the direct current supply voltage $V_{CC}$ functions as a power for supplying a voltage to various ICs including the control module 310, the power consumption by the control module 310 gradually reduces the voltage, and when the switching transistor $Q_{SW}$ 108 performs no switching operation for a long period of time, the direct current supply voltage $V_{CC}$ can be reduced to be less than the UVLO. During this scenario, the ICs including the control module 310 could be inappropriately operated, thereby generating a problem when controlling the output voltage $V_{out}$.

Figure 9:
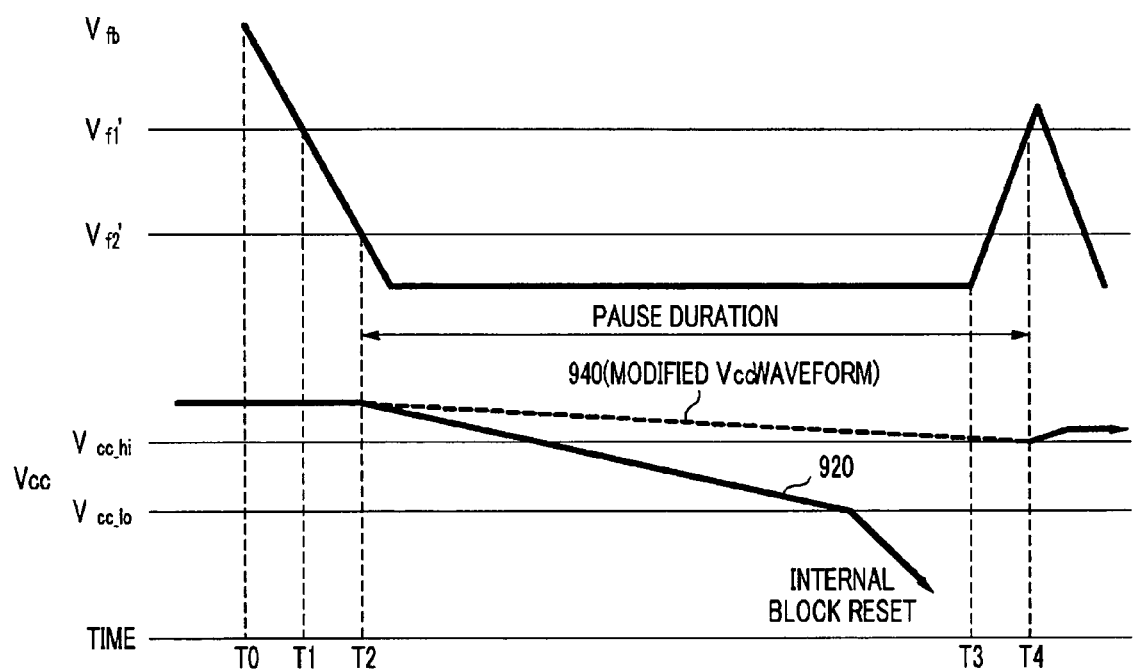
FIG. 9 is a graph of an exemplary relationship between a feedback voltage $V_{fb}$ and a DC voltage $V_{CC}$.

FIG. 9 is a graph of an exemplary relationship between a feedback voltage $V_{fb}$ and a DC supply voltage $V_{CC}$. In detail, FIG. 9 shows a waveform 920 of the DC supply voltage $V_{CC}$ with respect to the feedback voltage $V_{fb}$ according to the second embodiment, and a waveform 940 achieved by improving the DC supply voltage $V_{CC}$ according to the second embodiment.

As shown in FIG. 9, the DC supply voltage $V_{CC}$ starts to decrease at time T2 where the feedback voltage $V_{fb}$ gradually decreases to be less than the second feedback reference voltage $V_{f1}'$ (refer to waveform 920). Referring to FIG. 8, the switching MOS transistor $Q_{SW}$ 108 performs no switching on/off operation from that time to insure that no current flows through the switching MOS transistor $Q_{SW}$ 108 when the feedback voltage $V_{fb}$ is less than the second feedback reference voltage $V_{f2}'$. Hence, no energy is transmitted to the DC supply voltage $V_{CC}$, and the DC supply voltage $V_{CC}$ starts to decrease due to power consumption by the above-noted ICs. In this case, when there is a long pause in FIG. 9 during which the switching MOS transistor $Q_{SW}$ 108 performs no switching on/off operation, the DC supply voltage $V_{CC}$ becomes lower than the UVLO voltage ($V_{CC}\_lo$), and internal blocks of the various ICs are reset. That is, when the DC supply voltage $V_{CC}$ is decreased to be less than the UVLO voltage, the internal blocks thereof are reset and the output voltage $V_{out}$ is inappropriately regulated.

A method for solving the problem in which the DC supply voltage $V_{CC}$ is lower than the UVLO voltage in the SMPS including a control module, according to the second embodiment, will now be described. The DC supply voltage $V_{CC}$ functions to generate a plurality of constant current sources for controlling the various IC blocks. It also consumes power for a desired constant current source (used for the burst mode operation) from among the constant current sources at time T2 when the feedback voltage $V_{fb}$ becomes lower than the second feedback reference voltage $V_{f2}'$; that is, when the switching transistor $Q_{SW}$ 108 performs no switching on/off operation.

Figure 10:
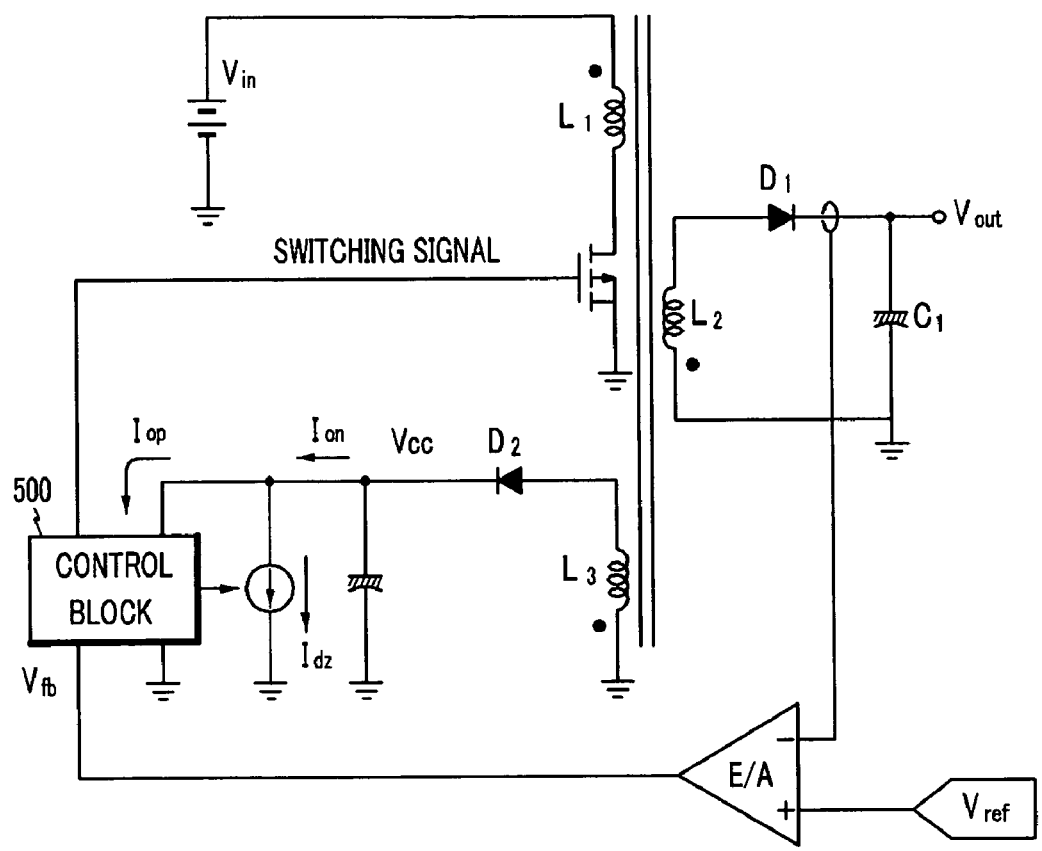
FIG. 10 is a conceptual circuit diagram for reducing power consumption of ICs.

FIG. 10 is an exemplary conceptual circuit diagram for reducing power consumption of ICs in a like manner of FIG. 1. A control block 500 of FIG. 10 corresponds to the control module 310 of FIG. 1.

Referring to FIG. 10, the DC supply voltage $V_{CC}$ generates a constant current source $I_{on}$ for operating ICs including a control block 500, as given in Equation 3.

Equation 3:

$$V_{CC} = \frac{1}{C}\int I_{on}dt$$

The constant current source $I_{on}$ is given as a summation of two constant current sources $I_{op}$ and $I_{dz}$.

$$I_{on}=I_{op}+I_{dz} \qquad \text{Equation 4:}$$

where $I_{op}$ is a current source (e.g., $I_4$ 364 and $I_5$ 374 in FIG. 6) for controlling the burst mode operation, and $I_{dz}$ is a current source for operating an unneeded block in the burst mode operation to be thus undesirably consumed. Therefore, power consumption is reduced by intercepting the generation of the $I_{dz}$ when the feedback voltage $V_{fb}$ is reduced to be lower than the second feedback reference voltage $V_{f2}'$, and the switching transistor $Q_{SW}$ 108 performs no switching on/off operation. Blocks which may be included, but are not needed, are a protection block (for protecting various circuits not shown), a reference voltage block (for supplying a reference voltage to ICs not shown), and an OSC 340 operation block. The decreased amount of the DC supply voltage $V_{CC}$ is controlled by intercepting the application of the constant current source to ICs of the unneeded blocks.

Figure 11:
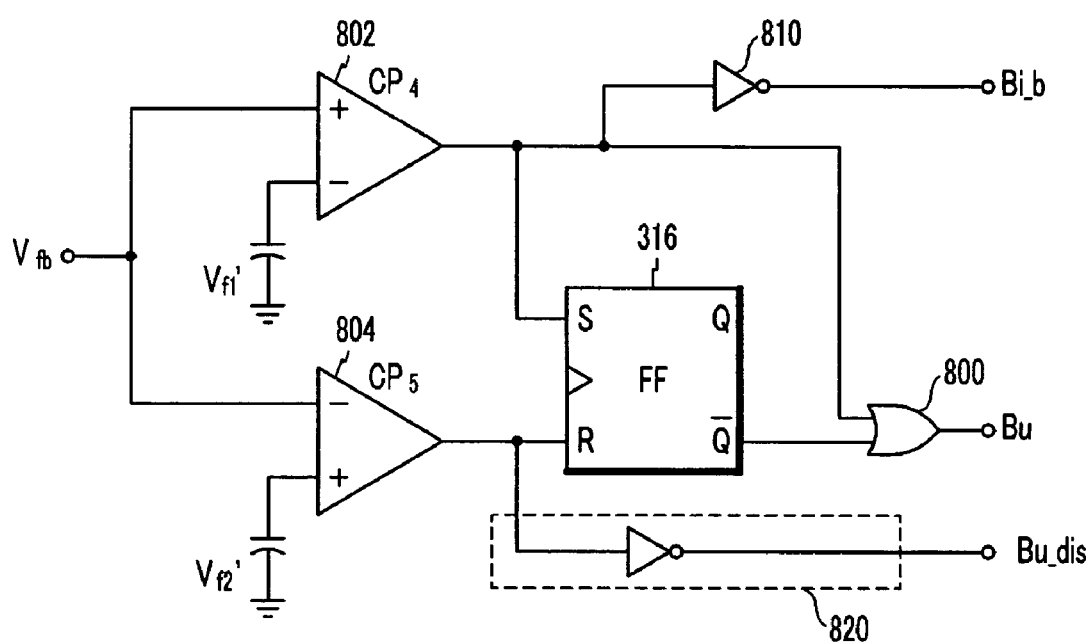
FIG. 11 is a circuit diagram for sensing a point at which the feedback voltage is lower than a second feedback reference voltage.

FIG. 11 is a circuit diagram for sensing a point at which the feedback voltage $V_{fb}$ is lower than the second feedback reference voltage $V_{f2}'$. The circuit of FIG. 11 is very similar to that of FIG. 7, and further includes a sensor 820 for sensing a point at which the feedback voltage $V_{fb}$ becomes lower than the second feedback reference voltage $V_{f2}'$ through an output signal of the comparator $CP_5$ 804. When the feedback voltage $V_{fb}$ is lower than the second feedback reference voltage $V_{f2}'$, the comparator $CP_2$ 312 generates a high signal (H), and the sensor 820 senses time point T2, at which point the switching transistor $Q_{SW}$ 108 performs no switching on/off operation through the high signal (H), generates a corresponding signal Bu_dis, and transmits the signal Bu_dis to be used for reducing power consumption of the ICs. The sensor 820 in FIG. 11 includes an inverter, but the same can also be implemented by other means.

Figure 12:
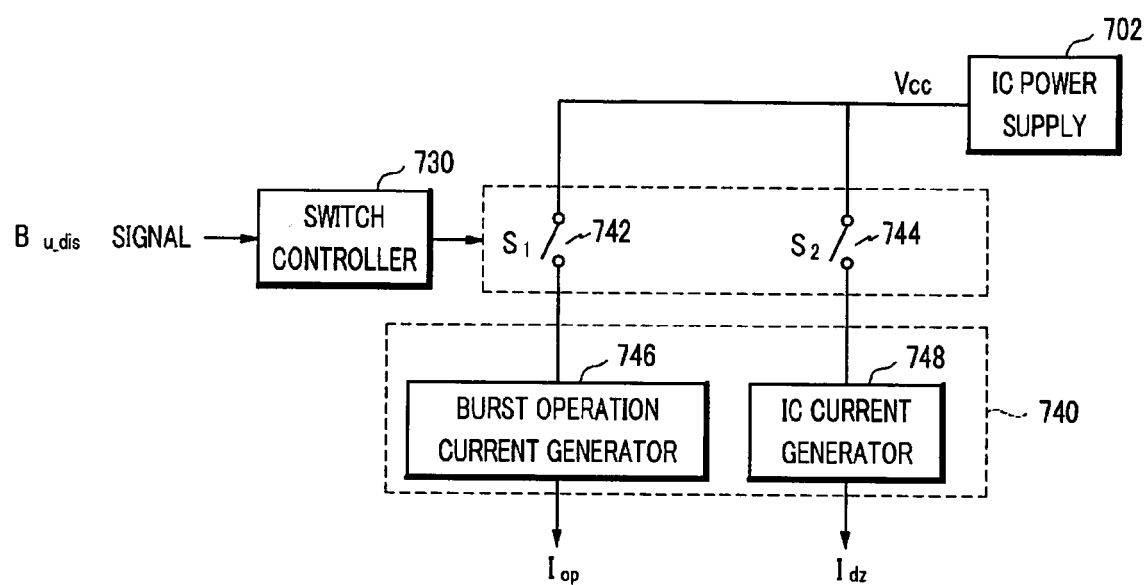
FIG. 12 is a block diagram of an exemplary SMPS for reducing power consumption of ICs according to an embodiment of the present invention.

FIG. 12 is a block diagram of an exemplary SMPS for reducing power consumption of ICs according to an embodiment of the present invention.

As shown, the SMPS includes an IC power supply 702, a switch controller 730, a current generator 740, and switches S1 742 and S2 744. The current generator 740 includes a burst operation current generator 746 and an IC current generator 748.

The IC power supply 702 corresponds to the secondary coil $L_3$ 306, the diode $D_2$ 304, and the capacitor $C_2$ 302 of FIG. 1, and generates a DC supply voltage $V_{CC}$.

The switch controller 730 receives the signal Bu_dis from the sensor 820 to control the switch S1 742 to be turned on when the feedback voltage $V_{fb}$ is less than the second feedback reference voltage $V_{f2}'$, and to control the switches S1 742 and S2 744 to be turned on when the feedback voltage $V_{fb}$ is greater than the second feedback reference voltage $V_{f2}'$. In particular, when feedback voltage $V_{fb}$ is less than the second feedback reference voltage $V_{f2}'$, the switch S1 742 is turned on so that the DC supply voltage $V_{CC}$ is applied to the burst operation current generator 746 and the constant current $I_{op}$ is generated, and the switch S2 744 is turned off so that no DC supply voltage $V_{CC}$ is applied thereto, and no constant current $I_{dz}$ is generated. When feedback voltage $V_{fb}$ is greater than the second feedback reference voltage $V_{f2}'$, the switches S1 742 and S2 744 are turned on and the constant currents $I_{op}$ and $I_{dz}$ are generated.

The current generator 748 generates a plurality of constant currents for operating the ICs. In detail, the burst operation current generator 746 generates constant current sources (e.g., $I_4$ 364 and $I_5$ 374 in FIG. 7) for the burst operation, and the IC current generator 748 generates a constant current source $I_{dz}$ for driving the ICs. A method for using the DC supply voltage $V_{CC}$ to generate the constant currents by the burst operation current generator 746 and the IC current generator 748 is known to a person skilled in the art, and hence, no corresponding description will be provided.

Accordingly, undesired power consumption can be reduced by generating the constant current source $I_{op}$ when the feedback voltage $V_{fb}$ is less than the second feedback reference voltage $V_{f2}'$, that is, when the transistor $Q_{SW}$ 108 performs no switching operation. In addition, the problem where the DC supply voltage $V_{CC}$ gradually decreases to be lower than the UVLO voltage in the case of no load is prevented by the reduction of undesired power consumption, as shown by the waveform 940 of FIG. 9.

The current of the constant current source $I_3$ 358 flows to the ground through the diode $D_6$ 352 and the phototransistor $PC_2$ 202, and the current of the capacitor $C_{fb}$ 204 also flows to the ground through the phototransistor $PC_2$ 202 at time T2 in the control module circuit according to the second embodiment shown in FIGS. 6 to 8. That is, the constant current source $I_3$ 358 is not used for controlling the switching transistor $Q_{SW}$ 108 during the pause duration shown in FIG. 9. Therefore, the DC supply voltage $V_{CC}$ is further reduced gradually by controlling the current of the constant current source $I_3$ 358 to be very low and accordingly reducing the power consumption during the pause duration. In particular, the constant current source $I_3$ 358 or $I_1$ 330 influences the power consumption of the system since the constant current source occupies 30 to 40% of the total current source.

Figure 13:
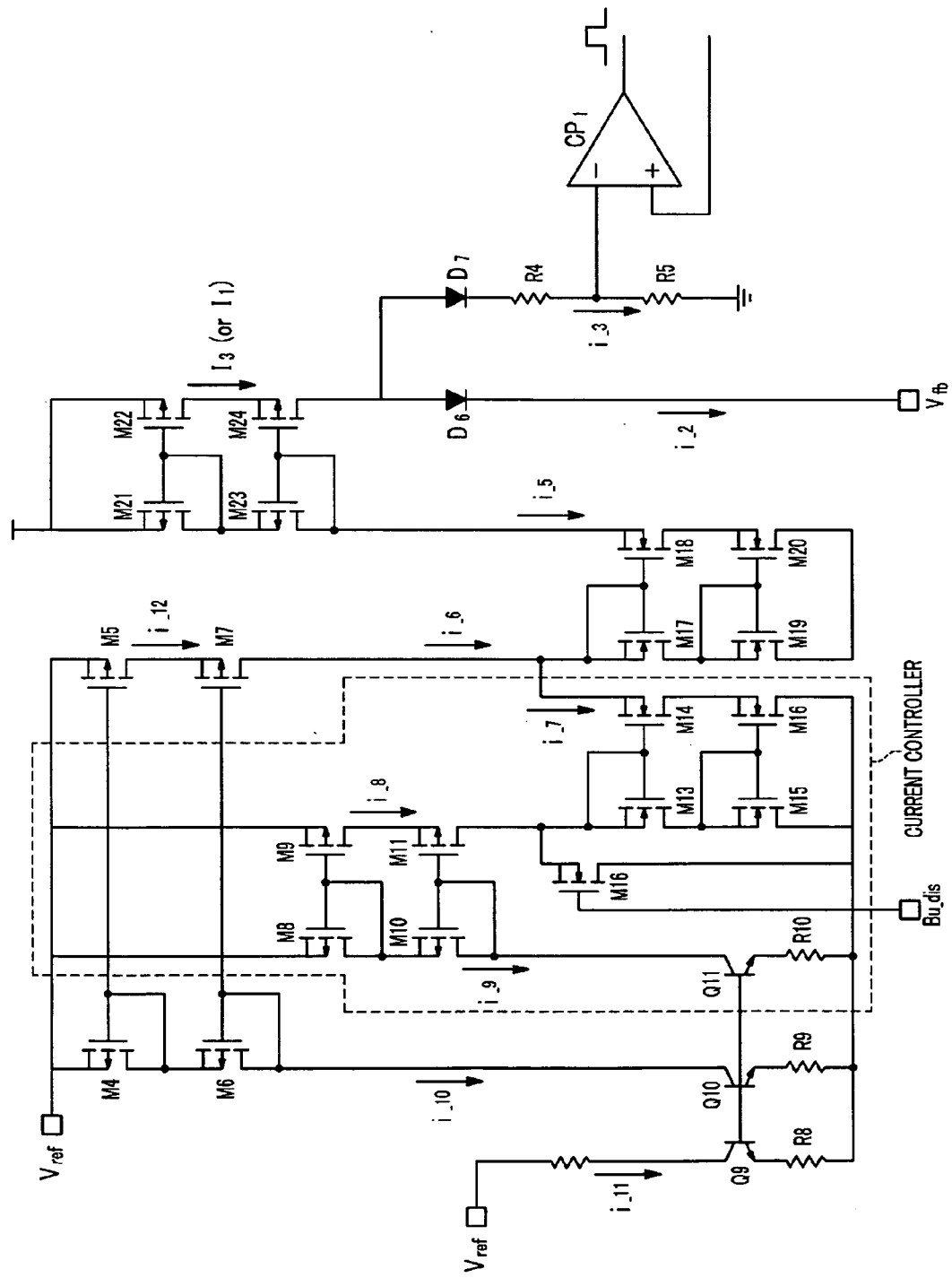
FIG. 13 is an exemplary circuit diagram for reducing power consumption of ICs according to an embodiment of the present invention.

FIG. 13 is an exemplary circuit diagram for reducing power consumption of ICs according to an embodiment of the present invention. In detail, FIG. 13 shows a circuit for reducing the current of the constant current source $I_3$ 358 of FIG. 6 according to the feedback voltage $V_{fb}$ through a plurality of current mirrors.

Referring to FIG. 13, the circuit may include a plurality of current mirrors (M4, M5, M6, and M7), (M8, M9, M10, and M11), (M13, M14, M15, and M16), (M17, M18, M19, and M20), and (M21, M22, M23, and M24), npn bipolar junction transistors $Q_9$, $Q_{10}$, and $Q_{11}$, a reference voltage $V_{ref}$ 420 for biasing the current mirrors, and a MOS transistor M12 that can be turned on and off according to the signal Bu_dis. The current mirrors (M4, M5, M6, and M7), (M8, M9, M10, and M11), (M13, M14, M15, and M16), (M17, M18, M19, and M20), and (M21, M22, M23, and M24) generate desired currents from a reference current corresponding to a drain-source width and a drain-source length of the MOS transistor. The current mirrors (M4, M5, M6, and M7) and (M13, M14, M15, and M16), and the MOS transistor M12 configure a current controller for further reducing the current of the constant current source $I_3$ 358 at time T2.

In the case of the normal operation mode, the signal Bu_dis becomes high (H) and the MOS transistor M12 is turned off. The current $I_3$ 358 is generated from a current i_5 by the current mirror (M21, M22, M23, and M24) and the current i_5 is generated from a current i_10 by the current mirror (M4, M5, M6, and M7). The current mirror (M4, M5, M6, and M7) is configured such that the current i_10 may correspond to a current i_6, the current mirror (M17, M18, M19, and M20) is configured such that the current i_5 may be five times the current i_6, and the current mirror (M21, M22, M23, and M24) may be configured such that the current $I_3$ 358 may be nine times the current i_5. As a result, the current $I_3$ 358 is forty-five times the current i_6. For example, the current $I_3$ 358 is given to be 900 uA when the currents i_10, i_6, and i_5 are respectively 20, 20, and 100 uA.

In the standby operation mode, the signal Bu_dis becomes low (L) and the MOS transistor M12 is turned on at time T2 as shown in FIG. 11. The maximum amplitude of the current i_12 is controlled by the current mirror (M4, M5, M6, and M7). When the MOS transistor M12 is turned on, a current i_8 generated by the current mirror (M8, M9, M10, and M11) causes a current i_7 to be generated by the current mirror (M13, M14, M15, and M16). That is, when the MOS transistor M12 is turned on, the current i_7 flows through the current mirror (M13, M14, M15, and M16) and the current i_6 is accordingly reduced. For example, when the current i_10 of 20 uA is given in the normal operation mode, the currents i_6, i_5, and $I_3$ 358 are respectively 20, 100, and 900 uA. However, when the MOS transistor M12 is turned on and the maximum amplitude of the current i_12 is given as 30 uA, the currents i_7, i_6, i_5, and $I_3$ 358 are respectively 28, 2, 10, and 90 uA. Hence, the current $I_3$ 358 is varied to 90 uA from 900 uA in the standby operation mode.

Therefore, power consumption by the control module can be further reduced by decreasing the current $I_3$ 358 at time T2 and reducing the power consumed by the ground through the phototransistor PC in the standby operation mode, and insuring that the reduction of the DC supply voltage $V_{CC}$ is less than the UVLO voltage during the pause duration of FIG. 9.

The current of the constant current source $I_3$ 358 is reduced by using the current mirrors in FIG. 13, and it is also possible to reduce power consumption of ICs by using the current mirrors and reducing the current of the constant current source $I_3$ 358 in the standby operation mode in the first embodiment shown in FIG. 1.

As described herein, the control module 310 according to embodiments of the present invention delimits a maximum amplitude of current below a predetermined level by using an automatic burst operation mode and a current operation mode, thereby preventing occurrence of audible noise. In particular, it is possible to design the internal circuit more simply and reduce power consumption required for conversion from the burst mode into the normal operation mode by controlling the switching transistor according to two sense levels (e.g., the first feedback reference voltage and the second feedback reference voltage). Power consumption is further reduced by controlling supply of the constant current to the undesired IC block at a period during which the switching transistor performs no switching operation.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A switching mode power supply comprising:
   a power supply for supplying power to a secondary coil of a transformer according to an operation of a main switch, the main switch coupled to a primary coil of the transformer;
   a feedback circuit for generating a feedback voltage corresponding to an output voltage;
   a control module for controlling the main switch to be stopped when the feedback voltage is lower than a reference voltage in a standby operation mode;
   an integrated circuit (IC) power supply for generating a constant voltage, the IC power supply being coupled to the secondary coil of the transformer; and
   a current generator for using the constant voltage to generate a plurality of constant currents for operating a plurality of ICs, and generating a constant current from the plurality of constant currents when the main switch performs no switching on/off operation.

2. The switching mode power supply of claim 1, wherein the constant current from the plurality of constant currents is used to operate an IC which controls the main switch to stop the switching on/off operation.

3. The switching mode power supply of claim 1, wherein the control module has a first reference voltage and a second reference voltage lower than the first reference voltage, and controls the main switch to stop the switching on/off operation when the feedback voltage is switched to the second reference voltage from the first reference voltage.

4. The switching mode power supply of claim 3, wherein the control module comprises:
   a first constant current source for generating the first reference voltage;
   a second constant current source for generating the second reference voltage; and
   a current controller for reducing the current of the first constant current source when the main switch performs no switching on/off operation.

5. The switching mode power supply of claim 4, wherein the control module further comprises:
   a comparator for comparing the second reference voltage with the feedback voltage; and
   a sensor for sensing a time point at which the feedback voltage is lower than the second reference voltage according to an output signal of the comparator, where the current controller reduces the current of the first constant current source according to an output signal of the sensor.

6. The switching mode power supply of claim 4, wherein the current controller includes a plurality of current mirrors.

7. The switching mode power supply of claim 1, wherein the IC power supply includes:
   a diode having an anode coupled to the secondary coil of the transformer; and
   a capacitor coupled between a cathode of the diode and the ground.

8. A switching mode power supply comprising:
   a power supply for supplying power to a secondary coil of a transformer according to an operation of a main switch, the main switch coupled to a primary coil of the transformer;
   a feedback circuit for generating a feedback voltage corresponding to an output voltage;
   an integrated circuit (IC) power supply for generating a constant voltage, the IC power supply being coupled to the secondary coil of the transformer;
   a control module for generating a first reference voltage and a second reference voltage lower than the first reference voltage, and controlling the main switch to stop the switching on/off operation when the feedback voltage is lower than the second reference voltage in a standby operation mode; and
   a current controller for using the constant voltage to generate a first constant current source for generating the first reference voltage and a second constant current source for generating the second reference voltage, and reducing the current of the first constant current source when the main switch performs no switching on/off operation.

9. The switching mode power supply of claim 8, wherein the control module comprises:
   a comparator for comparing the second reference voltage with the feedback voltage; and
   a sensor for sensing a time point at which the feedback voltage is lower than the second reference voltage according to an output signal of the comparator, where the current controller reduces the current of the first constant current source according to an output signal of the sensor.

10. The switching mode power supply of claim 8, wherein the current controller includes a plurality of current mirrors.

11. The switching mode power supply of claim 8, wherein the IC power supply includes:
    a diode having an anode coupled to the secondary coil of the transformer; and
    a capacitor coupled between a cathode of the diode and the ground.

* * * * *